US005221971A

United States Patent [19]
Allen et al.

[11] Patent Number: 5,221,971
[45] Date of Patent: Jun. 22, 1993

[54] AREA MODULATION PRINTING APPARATUS

[75] Inventors: Janet A. Allen, Boston; Daniel P. Bybell, West Medford, both of Mass.; Dana F. Schuh, Derry, N.H.; Jay E. Thornton, Watertown, Mass.

[73] Assignee: Polaroid Corporation, Cambridge, Mass.

[21] Appl. No.: 616,786
[22] Filed: Nov. 21, 1990
[51] Int. Cl.⁵ ............................................. H04N 1/21
[52] U.S. Cl. ................................... 358/459; 358/460; 358/298
[58] Field of Search ............... 358/298, 459, 456, 458, 358/460, 457; 346/108, 160

[56] References Cited

U.S. PATENT DOCUMENTS

| | | |
|---|---|---|
| 3,604,846 | 9/1971 | Behane et al. . |
| 3,646,262 | 2/1972 | Moe . |
| 3,806,641 | 4/1974 | Crooks . |
| 3,922,484 | 11/1975 | Keller . |
| 4,084,259 | 4/1978 | Cahill et al. . |
| 4,149,183 | 4/1979 | Pellar . |
| 4,196,451 | 4/1980 | Pellar . |
| 4,257,072 | 3/1981 | Sakamoto . |
| 4,281,312 | 7/1981 | Knudson . |
| 4,386,272 | 5/1983 | Check, Jr. et al. . |
| 4,389,712 | 6/1983 | Frattarola et al. . |
| 4,445,126 | 4/1984 | Tsukada ............................... 346/108 |
| 4,447,831 | 5/1984 | Adsett . |
| 4,468,706 | 8/1984 | Cahill . |
| 4,470,075 | 9/1984 | Yoshimoto et al. . |
| 4,486,788 | 12/1984 | Yamada . |
| 4,491,875 | 1/1985 | Kawamura ........................... 358/298 |
| 4,499,489 | 2/1985 | Gall . |
| 4,593,297 | 6/1986 | Suzuki et al. . |
| 4,625,222 | 11/1986 | Bassetti et al. . |
| 4,647,962 | 3/1987 | Rosen et al. . |
| 4,651,287 | 3/1987 | Tsao . |
| 4,661,859 | 4/1987 | Mailloux et al. . |
| 4,689,694 | 8/1987 | Yoshida . |
| 4,700,201 | 10/1987 | Sato . |
| 4,727,430 | 2/1988 | Miwa . |
| 4,768,043 | 8/1988 | Saito et al. ........................... 346/108 |
| 4,814,886 | 3/1989 | Kuge et al. . |
| 4,850,675 | 7/1989 | Hatanaka et al. . |
| 4,866,533 | 9/1989 | Nagashima . |
| 4,897,734 | 1/1990 | Sato et al. . |
| 4,905,022 | 2/1990 | Nagasawa . |
| 4,914,455 | 4/1990 | Hayes . |
| 4,916,530 | 4/1990 | Neilson et al. . |
| 4,918,622 | 4/1990 | Granger et al. . |
| 4,958,239 | 9/1990 | Yamada et al. ...................... 358/457 |
| 4,965,672 | 10/1990 | Duke et al. . |
| 4,973,989 | 11/1990 | Yamamoto . |
| 4,985,779 | 1/1991 | Gall ...................................... 358/298 |
| 5,055,943 | 10/1991 | Kishida ................................ 358/459 |

FOREIGN PATENT DOCUMENTS 52-106737  3/1976  Japan .

OTHER PUBLICATIONS

"Electronically Generated Halftone Pictures"-R. J. Klensch, RCA Review, Sep. 1970, pp. 517-533.
"A Survey of Techniques for the Display of Continuous Tone Pictures on Bilevel Displays"-J. F. Jarvis, C. N. Judice, and W. H. Ninke, Computer Graphics and Image Processing 5, 13-40, 1976, pp. 13-40.
"Binary Approximation of Continuous Tone Images'-'—P. G. Roetling, Photographic Science and Engineering, vol. 21, No. 2, Mar./Apr. 1977, pp. 60-65.
"Hardcopy Output of Reconstructed Imagery"—D. G. Herzog, Journal of Imaging Technology, vol. 13, No. 5, Oct. 1987, pp. 167-178.
"Using Pixel Overlap to Obtain More Gray Levels In Halftone Reproductions"—P. A. Torpey, Journal of Imaging Technology, vol. 14, No. 2, Apr. 1988, pp. 25-28.
"Hybrid (Gray Pixel) Halftone Printing"—W. Lama, S. Feth and R. Loce, Journal of Imaging Technology, vol. 15, No. 2, Jun. 1989, pp. 130,135.

Primary Examiner—Edward L. Coles, Sr.
Assistant Examiner—Scott A. Rogers
Attorney, Agent, or Firm—Francis J. Caufield

[57] ABSTRACT

Printing apparatus and method particularly suited to provide a hardcopy of an image which is produced by medical imaging equipment or the like. The apparatus produces hardcopy consisting of pixels whose size can be changed by area modulation to suit image tonal content and detail while still maintaining a large number of gray levels per area modulation cell (pixel). Preferably, the same area modulation patterns representing pixel tonal values are used for printing pixels of different sizes.

9 Claims, 24 Drawing Sheets

AREA MODULATION PRINTING APPARATUS

CROSS REFERENCE TO RELATED APPLICATIONS

This application is related to U.S. patent application Ser. Nos. 07/616,658, 07/616,633, 07/616,880, 07/616,417, and 07/616,406 filed on the same date herewith and commonly assigned.

BACKGROUND OF THE INVENTION

1. Field of the Invention

The present invention generally relates to method and apparatus for providing a copy of an image available in electronic form and, in particular, to method(s) and apparatus for providing a hardcopy of an image which has been produced by, for purposes of illustration and without limitation, medical imaging equipment such as x-ray equipment, CAT scan equipment, MR equipment, ultrasound equipment, and the like.

2. Description of the Prior Art

A hardcopy has been defined, for example, in an article by D. G. Herzog entitled "Hardcopy Output of Reconstructed Imagery," *J. Imaging Technology*, Vol. 13, No. 5, October, 1987, pp. 167–178, as "an image that is visible to the human observer, that has a degree of permanence, and can be transported and handled without deterioration of the image. Hardcopy normally is an image imprinted on transparencies where the image is viewed by passing light through the medium or an opaque material where the image is viewed by reflecting light off the image." Many attempts have been made by workers in the field to fabricate apparatus which can make a hardcopy of an electronically generated or stored image.

It is well known that devices for providing hardcopies typically receive image information as output from an image data source such as, for example, a group of sensors, a computer image processing system, or storage devices hardcopy services. Although such may receive image data in either analog or digital form, the general trend in the art today is to receive image data in digital form. Further, such devices typically comprise buffers, memories, look-up tables, and so forth for: (a) electronic processing and/or formatting input image data and (b) modifying the apparatus transfer function to compensate for effects such as, for example, print medium non-linearities or to compensate for, or to provide, image contrast enhancement. Still further, such hard devices typically comprise an image generator subsystem which includes energy shaping mechanisms and supporting electronics to convert an energy source such as, for example, a laser beam or a CRT beam into focused spots for scanning onto a medium.

There are certain important image quality parameters which must be taken into account when designing a hardcopy device. A first, important image quality parameter is resolution. Most imaging devices have the capability of recording many thousands of picture elements (pixels) across the medium. The ability to distinguish individual pixels or to smooth the image between pixels is determined by the resolution specification. A second, important image quality parameter is raster and banding. Raster and banding are artifacts that usually appear in pixel by pixel recording systems.

Raster is caused by incomplete merging of scan lines and appears as a regular pattern of density modulation at the pixel spacing whereas banding is caused by nonuniformity of pixel placement on the medium and may appear as regular or random patterns of density variation in across-scan or along-scan directions. The appearance of banding depends on the source of placement errors, and since the human visual system is very sensitive to placement errors, placement errors on the order of 1% can be discerned. As a result, banding requirements must be carefully considered due to the cost implications of providing precise pixel and scan line placement.

A third, important image quality parameter is geometric fidelity. Geometric fidelity specifications define the precision with which pixels are located on the medium and relate to how the medium will ultimately be used.

A fourth, important image quality parameter is density fidelity. The density fidelity specification defines the transfer function of the input digital value (or analog voltage) to output density. This specification encompasses the transfer function of value to density and the transfer function of any duplicating process utilized. The transfer function is dependent on processing variables as well as on the nature of the specific medium used. The density fidelity specification can be separated into four parts: (a) absolute density repeatability; (b) relative-density versus input-signal transfer function; (c) area modulation versus continuous tone recording; and (d) density uniformity. The first of these parts, absolute density repeatability, is the ability of the hardcopy device to consistently produce the same density values for given input signals. The second of these parts, relative-density versus input-signal transfer function, i.e., tone scale, is related to the fact that in some applications a linear-density versus input-signal transfer function is utilized while in others a deliberate distortion of the transfer function is utilized to provide contrast adjustment, compensation, or enhancement in certain parts of the density range. The shape of the relative-density versus input-signal transfer function can be adjusted using calibration look-up tables located in a digital input signal processing path, and these tables can be either fixed, locally adjusted via panel controls, or remotely loaded via a control interface. Further, if the shape of the relative-density versus input-signal transfer function is critical, an operational scenario involving media processor control, periodic transfer function measurement, and periodic calibration look-up table updating will be required. The third of these parts, area modulation versus continuous tone recording, will to be described in more detail below. Lastly, the fourth of these parts, density uniformity, refers to the ability of a hardcopy device to generate a uniform, flat field over the entire image area.

A continuous tone recording has an apparent continuum of gray scale levels such as are observed, for example, in photographs and in natural scenes. This is contrasted with an area modulation recording which is typically comprised of geometric patterns of, for example, printed dots—please note that printing with patterns of variable-sized dots is frequently referred to as halftone recording in the art. In halftone recording, the printed dot size in a regular array is varied to provide a range of tones perceived as a gray scale by the human eye.

As is well known to those of ordinary skill in the art, a continuous gray scale may be approximated in halftone recording because variations in printed dot size yield, for example, a varying percentage of light reflection from a printed image and, as a result, create an illusion of a gray scale. Although halftone recording is basically binary, at first blush, one would expect a halftone recording image to be like that of a line copy.

However, halftone recording is complicated by the presence of spatial frequencies which are not contained in the original image, which spatial frequencies may result in unwanted Moiré patterns or other artifacts in the halftone recording image.

As disclosed in the prior art, in one halftone recording method for achieving gray scale representations by binary devices, i.e., devices which display or print fixed size dots having no gray scale capability, each halftone cell, herein denoted as a pixel, is comprised of one or more clusters of individual print or display units, herein denoted as pels. The most common form of halftone pixel is an N by N square pel matrix of binary, fixed sized pels. The general concept of the method is to print or display a computed number of pels within a halftone pixel to achieve an average gray scale level which approximates the averaged density value of a corresponding portion of the original image. For example, in one such prior art halftone recording method, pels in a pixel are clustered to imitate the formation of a single halftone pixel and, in another such prior art halftone recording method, pels are dispersed in a predetermined manner. Further, in still another such prior art halftone recording method, referred to as "error diffusion," a decision to print or not to print a pel is made on the basis of local scanned density information from the original image as well as on gray scale density errors committed by already processed neighbors in the recording. In addition to the above, those of ordinary skill in the art appreciate that while halftone recording reproduces gray scale levels for a pixel in an averaged sense, there may be a loss of fine detail resolution in an image if the size of the pixel is too large.

All of the above-mentioned prior art halftone recording methods disclose the use of binary, fixed size, print or display dots. In contrast to this, U.S. Pat. No. 4,651,287 discloses a halftone recording method in which each picture element to be printed or displayed is programmably adjusted to have one of a fixed number of gray scale levels. The patent discloses a halftone recording apparatus which includes: (a) image data input apparatus such as, for example, a CCD scanner for scanning an original image and for producing an array of image input data corresponding to gray scale levels of picture elements of the original image; (b) processing apparatus for receiving the array of image input data and for computing an array of print values wherein each print value corresponds to one of a fixed number of gray scale levels; and (c) printing apparatus capable of printing picture elements having a dot size that corresponds to one of the fixed gray scale levels.

In addition, the patent discloses that a printer which is capable of printing picture elements wherein each picture element has a dot size that corresponds to one of a fixed number of gray scale levels may include apparatus which varies the energy necessary for the production of a printed dot. Further, the patent discloses that the energy necessary for the production of a printed dot is generally prescribed in the form of an electrical signal pulse having a predetermined time duration and a predetermined voltage level. Lastly, the patent discloses that variations of the energy can be affected by changing the following parameters of the electrical signal pulse: the on-time portion (duty cycle); the voltage level; or the electrical current flow.

U.S. Pat. No. 4,661,859 discloses an apparatus which produces a pixel having a variable gray scale. In particular, it discloses a one-dimensional electronic halftone generating system which is comprised of a source of digital data representative of pixel gray scale, a counter to store the digital data, and pulse producing logic responsive to the counter to activate a laser modulator in accordance with the digital data representative of each pixel. More particularly, a six bit data word is used to represent one of 64 gray scale levels for a pixel, and the pulse producing logic responds to the data word by producing a pulse of a predetermined duration or width which drives the laser for a predetermined time duration to produce a predetermined gray scale level for the pixel.

Notwithstanding the above prior art halftone recording methods and apparatus, there still remains a need in the art for method(s) and apparatus which can provide a faithful reproduction of an image rapidly, which method and apparatus include strong gray scale sensitivity without sacrificing resolution and which method and apparatus are particularly suitable for providing a reproduction of an image which is generated or acquired from medical imaging equipment such as x-ray equipment, CAT scan equipment, MR equipment, ultrasound equipment, and the like.

SUMMARY OF THE INVENTION

Embodiments of the present invention satisfy the above-identified need by providing method(s) and apparatus for providing a copy of an image and, in particular, for providing a hardcopy of an image which is generated or acquired from, for purposes of illustration and without limitation, medical imaging equipment such as x-ray equipment, CAT scan equipment, MR equipment, ultrasound equipment, or the like. In particular, embodiments of the present invention produce an area modulated hardcopy of the image, which hardcopy has a large number of gray levels per area modulation cell (pixel) and a strong density sensitivity, for example, a large number of gray level steps. This is accomplished by pulse width modulating two different-sized, printing radiation beams.

Specifically, in accordance with a preferred embodiment of the present invention, the printer comprises: means for obtaining or measuring as digital input image data intensity levels of radiation reflected by or transmitted through an image; means for interpolating and/or processing the digital input image data to provide digital intensity levels which correspond to areas on a medium, which areas are referred to as area modulation pixels, which, in turn, pixels are comprised of subunits referred to as pels; means for mapping each of the digital intensity levels into a predetermined pattern of pels; means for providing a drive signal to a source of laser radiation for activating the source to print the predetermined pattern of pels on the medium, wherein the source comprises a source of two different sized printing radiation beams and wherein the pels are formed by pulse width modulating the source of the two different sized beams.

In a further embodiment of the present invention, the printer "writes white" to enhance the accuracy of the copy at high densities where the term "write white" denotes the use of a medium wherein an unwritten medium has the highest density, i.e., all black, and a beam of radiation, for example, laser radiation, causes portions of the black to be reduced as one provides lower densities.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DETAILED DESCRIPTION

Figure 1:
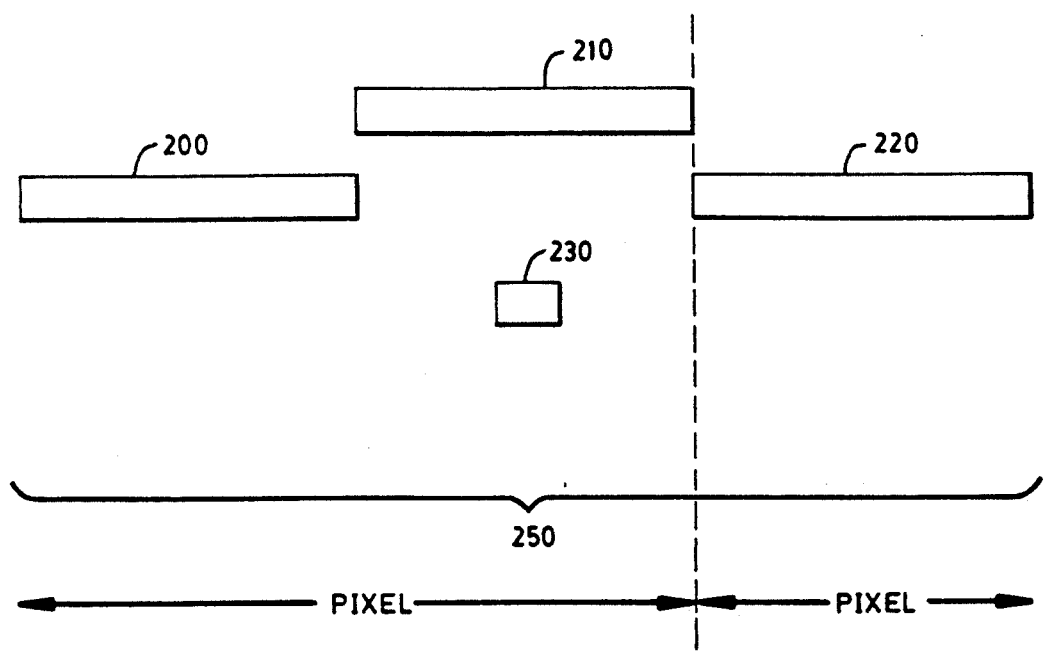
FIG. 1 shows, in pictorial form, a "paintbrush" of laser beams used to write an area modulation pixel in an embodiment of the present invention.

A printer fabricated in accordance with the present invention produces a hardcopy of an image, which image may be any one of a large number of different types of images which are well known to those of ordinary skill in the art. For example, the image may be, without limitation, a medical image produced by equipment such as x-ray equipment, CT scan equipment, MR equipment, ultrasound equipment, or the like. In the alternative, the image may be an image which is stored in, for example, digital or analog form, on a storage medium such as, for example, video tape, optical disk, magnetic disk, and so forth.

A hardcopy produced by an embodiment of the present invention is produced in a medium which is a high resolution, thermal imaging medium that forms images in response to intense radiation such as, for example, laser radiation.

Suitable medium materials for preparing hardcopy images using an embodiment of the present invention include the thermal imaging materials disclosed and claimed in International Patent Application No. PCT/US 87/03249 of M. R. Etzel (published Jun. 16, 1988, as International Publication No. W88/04237). A detailed description of a medium material preferred from the standpoint of producing an image having desired durability is found in the patent application of K. C. Chang, entitled, "Thermal Imaging Medium", U.S. Pat. No. 5,155,003, filed of even date and assigned to the assignee of the present patent application.

A preferred binary thermal imaging medium is a laminar medium including a pair of sheets, at least one of which is transparent. The sheets have image forming material sandwiched between their interior surfaces and, initially, preferentially adhered to one of them. When exposed to pulses of thermal radiation, the initial preferential adhesion is reversed so that, when said pair of sheets are separated, unexposed portions of image forming material adhere to the sheet for which there is initial preferential adhesion while exposed portions adhere to the sheet for which there is the reversed preferential adhesion whereby complimentary images can be formed on respective ones of the sheets. A preferred imaging laminate medium, actuatable in response to intense image-forming radiation for production of images in colorant/binder material of the type for uses with the present printer, comprises, in order:

(1) a first sheet-like web material, said web material being transparent to said image-forming radiation and having at least a surface zone or layer of polymeric material heat-activatable upon subjection of said thermal imaging medium to brief and intense radiation;

(2) an optional thermoplastic intermediate layer having cohesivity in excess of its adhesivity for said surface zone or layer of heat-activatable polymeric material;

(3) a layer of porous or particulate image-forming substance on said thermoplastic intermediate layer, said porous or particulate image-forming substance having adhesivity for said thermoplastic intermediate layer in excess of the adhesivity of said thermoplastic intermediate layer for said surface zone or layer of heat-activatable polymeric material; and (4) a second sheet-like web material covering said layer of porous or particulate image-forming substance and laminated directly or indirectly to said image-forming substance.

The thermal imaging medium is capable of absorbing radiation at or near the interface of said surface zone or layer of heat-activatable polymeric material and the thermoplastic intermediate layer, at the wavelength of the exposing source and of converting absorbed energy into thermal energy of sufficient intensity to heat activate the surface zone or layer rapidly. The heat-activated surface zone or layer, upon rapid cooling, attaches the thermoplastic intermediate layer firmly to the first sheet-like web material.

The thermal image medium is thus adapted to image formation by imagewise exposure of portions of it to radiation of sufficient intensity to attach exposed portions of the thermoplastic intermediate layer and image-forming substance firmly to the first sheet-like web material, and by removal to the second sheet-like web material, upon separation of the first and second sheet-like web materials after imagewise exposure, of portions of the image-forming substance and the thermoplastic intermediate layer, thereby to provide first and second images, respectively, on the first and second sheet-like web materials.

The optional thermoplastic intermediate layer provides surface protection and durability for the second image on the second sheet-like web material.

Thus, two steps are required to form a hardcopy with the thermal hardcopy medium. One step comprises exposing the medium to the proper amount of heat to form a latent image and the other step comprises processing the latent copy by a peeling process whereby the second sheet carries with it the unexposed parts of the image forming substance and, in a preferred embodiment, as will be explained in further detail below, the hardcopy.

Even through the preferred medium is a laminated structure, it will be clear that two unlaminated sheets with equivalent functions can also be used in practicing the invention.

Lasers are particularly suitable for exposing the medium because the medium is termed a threshold or binary type of film. That is, to say, it possesses high contrast and, if exposed beyond a certain threshold value, it will yield maximum density change, whereas no density at all is obtained below this threshold.

A hardcopy produced by an embodiment of the present invention is comprised of a multiplicity of pixels. In particular, in a preferred embodiment of the present invention, each pixel is about 60 $\mu$m × 60 $\mu$m, about 90 $\mu$m × 90 $\mu$m, or some variation of these sizes. Further, the hardcopy is produced by digital area modulation, also referred to as spatial dithering in the art. Area modulation is a method wherein each pixel is comprised of a predetermined number of pels and a particular tone, density, or gray scale level for a pixel is produced as a predetermined pattern of pels. As is well known in the art, area modulation provides an illusion of a continuous tone image in a medium which is capable of producing only black and white pels since the area modulation tones appear to have different densities when viewed at an appropriate distance.

The following describes the criteria that are used in determining pixel size, pel size, and pel configuration patterns for preferred embodiments of the present invention.

It is well known in the art that, in general, there is a trade-off between copy resolution and the number of gray scale levels which are needed to produce a quality copy of an image. For example, the use of an area modulation pixel comprised of n × m pels allows reproduction of nm + 1 distinct gray scale levels for a binary medium. Further, using the same pel size, an increased number of gray scale levels can be obtained by increasing the size of an area modulation pixel. However, if the size of a pixel is increased, there is a loss of resolution in the hardcopy. On the other hand, if too few gray scale levels are available for printing, i.e., too few steps in the tone scale can occur. This is the appearance of a contour in the hardcopy that was not present in the original image and often occurs when a reproduction is made of a large, smoothly varying, gray scale transition.

Thus, in general, at least two measures are important in assessing the quality of a hardcopy made on a printer using a binary medium: (1) the area modulation frequency, i.e., the number of area modulation pixels per linear inch, and (2) the number of distinguishable gray scale levels. The required number of distinct gray scale levels in a hardcopy depends on the ability of the unaided eye to distinguish closely spaced gray scale levels. For example, it has been found that, at normal ready distance, the human eye can detect a reflectance modulation of about 0.5% at a spatial frequency near 1 cycles/mm. The inverse of this "just perceptible" modulation has been interpreted as the maximum number of gray scale levels that the human eye can perceive, i.e., a rule of thumb in the printing industry is that a "just acceptable" picture should contain about 65 gray scale levels and, for a good quality copy, 100 or more levels is desired but, for medical applications, 200 or more levels are more appropriate. In addition to this, it is also known that a substantial improvement in copy quality can be achieved when pels have more than two gray scale levels.

In view of the above, the following criteria were used in arriving at choices for the size of a pixel and a pel for preferred embodiments of the present invention: (1) a pixel should be as small as is required to be invisible to the naked human eye and to produce a high quality copy; (2) for a given pel size, a pixel should be as large as is required to comprise a large enough number of pels to provide a suitable number of distinguishable gray scale levels and to provide a suitable mapping of density levels from the image to the copy (As will be explained below, although the ratio of the size of a pixel to the size of a pel determines the number of pels which comprise a pixel and this, in turn, determines the number of gray scale levels which can be achieved, this ratio alone does not provide the capability for a one-to-one mapping of density from an image to a copy); and (3) the pel pattern should not contribute to texturing or contouring in the copy.

In addition to the above, we have developed an additional criterion which is derived from the fact that a perceived gray scale level of a pixel is not linearly related to the ratio of black and white areas therein because the human eye does not perceive gray scale level as a linear function but as a logarithmic function of intensity. One implication of this is that the gray scale level of a pixel whose density is one density unit from the maximum pixel density is determined by the size of a pel and, as a result, the jump in density from the highest density on the gray scale level, i.e., $D_{max}$, to the next highest density on the gray scale level, i.e., $D_{max-1}$, must be small. Lastly, the choice of pixel size, pel size, and pel configuration patterns is made in light of the fact that the number of gray scale levels which are detectable by the human eye, i.e., the least detectable contrast, decreases rapidly with spatial frequency. Thus, at the resolution limit of the eye, one need only represent black and white.

In accordance with the above-stated criteria, we have determined that a pixel size of about 60 $\mu$m × 60 $\mu$m provides high resolution copies and solves the problem of pixel visibility for a copy page of generally available sizes such as, for example, 8"×10", 11"×14", 14"×17", or the like. In addition, due to considerations regarding copy speed, a "print" pixel of about 90 $\mu$m × 90 $\mu$m is also written in a preferred embodiment.

Initial attempts to make copies using a "print" pixel of about 90 $\mu$m × 90 $\mu$m entailed the use of three laser beams, each of which provided a pel having a spot size of about 30 $\mu$m × 30 $\mu$m on the medium. However, as was explained above, such an arrangement can provide only 91 linear transmission increments and this, it was discovered, provided an inadequate number of gray scale levels for certain applications. In fact, a far larger number of transmission increments are needed to provide a more suitable number of gray scale levels. A larger number of transmission increments is provided, in accordance with the present invention, by pulse width modulation of the driving signal for the radiation beams, in this embodiment, the driving signal for the laser sources, to produce variable sized pels.

In accordance with the present invention, a pixel is "painted" with a predetermined area a modulation pattern of pels, which predetermined area modulation pattern of pels corresponds to a predetermined intensity level in the original image or to a predetermined intensity level computed by the printer. In this context, the term "painted" refers to the exposure of a pixel of heat sensitive medium to beams of laser radiation. In a preferred embodiment of the present invention, a pixel is chosen to be substantially 60 $\mu$m × 60 $\mu$m or 90 $\mu$m × 90 $\mu$m in area and a "paintbrush," i.e., the beams of laser radiation, which is used to "paint" the pixel with pels is comprised of four separate beams of laser radiation. As shown in FIG. 1, each of the first three beams of radiation 200, 210, and 220 in "paintbrush" 250 provides a spot on the medium whose smallest footprint thereon is an area which is substantially equal to 30 μm×3 μm. Beams 200-220 are aligned in an offset configuration so that a stroke of "paintbrush", labeled as 250 covers one and one-half (1.5) 60 μm×60 μm pixels or one 90 μm×90 μm pixel. As was discussed above, the choice for the size of beams 200, 210, and 220 was determined by the criteria set forth above as well as factors such as the complexity and expense required to provide a smaller sized pel, the additional print time required in producing a hardcopy with a smaller sized pel, and the complexity, expense and print time involved in utilizing additional laser beams.

As also shown in FIG. 1, in addition to beams 200-220, "paintbrush" 250 is comprised of a fourth beam of radiation, beam 230. Beam 230 provides a spot on the medium whose smallest footprint thereon is an area which is substantially equal to 5 μm×3 μm, and beam 230 is aligned so that it traverses a line which passes roughly through the center of beam 210.

As described above, in this preferred embodiment, each of beams 200-230 has a minimum footprint width on the medium, i.e., distance from top to bottom of a footprint, of substantially 3 μm. However, in accordance with the present invention, the footprint width is variable for each of the four beams, i.e., beams 200-230. The footprint width is varied by allowing a beam to impinge upon the medium for a variable amount of time as the medium passes under the beam. The variable amount of time for allowing a beam to impinge upon the medium is provided in the preferred embodiment by pulse width modulating each laser beam so that the footprint width can vary from the thickness of the laser beam, i.e., approximately 3.0 μm or more, to roughly 60.0 μm or 90.0 μm in increments of 0.375 μm. This method of pulse width modulating the laser beam radiation will be referred to below as slicing.

In accordance with the present invention, slicing is achieved by modulating the writing frequency of a laser drive signal such that a laser is turned on for a minimum writing time (t) to write, for example, 3 μm or for longer times (t+x*dt), where dt is the time to write a slice and x is the number of desired slices. The use of slicing increases the effective number of pels in a pixel.

In a particular embodiment of the present invention, the choice of slice size is determined by balancing the need to provide an adequate number of gray scale levels and the complexity involved in providing very small slices. Very small slices place great demands on both hardware and medium. Hardware needs to become more complex while medium must be capable of generating small spots. As a result, in the preferred embodiment, we have chosen a slice of about 0.375 μm. However, it should be clear to those of ordinary skill in the art that the particular choice of the number of slices and the minimum and maximum widths for a pel is a matter of design choice and does not limit the scope of the present invention.

The following describes the advantageous results which are obtained from the use of laser beams which have different footprints on the medium, i.e., laser beams 200-220 each have a minimum footprint of about 30 μm×3 μm and laser beam 230 has a minimum footprint of about 5 μm×3 μm. If copies were printed on the above-described medium—the highest gray scale level for the above-described medium corresponds to a density value, $D_{max}$, approximately equal to 3.0 Using 90 μm×90 μm pixels and laser beams with a minimum footprint, i.e., pel size, of about 30 μm×3 μm, the next highest gray scale level in the copies would correspond to a density value $D_{max-1}$ approximately equal to 2. Another way of understanding this result is to appreciate that if one were to produce copies using pels having a minimum footprint of about 30 μm×3 μm, one would make the density range between 2 and 3 inaccessible in the copies. This, of course, is unacceptable for a printer which has to produce copies of images provided by medical imaging equipment where vital information is recorded by density variations. Specifically, as stated in Neblette's Handbook of Photography and Reprography, Seventh Edition, Edited by John M. Sturge, Van Nostrand and Reinhold Company, at p. 558-559: "The most important sensitometric difference between x-ray films and films for general photography is the contrast. X-ray films are designed to produce high contrast because the density differences of the subject are usually low and increasing these differences in the radiograph adds to its diagnostic value.

Radiographs ordinarily contain densities ranging from 0.5 to over 3.0 and are most effectively examined on an illuminator with adjustable light intensity. . . . Unless applied to a very limited density range the printing of radiographs on photographic paper is ineffective because of the narrow range of densities in the density scale of papers."

As a result, the printer needs to be able to write a pel having a substantially smaller size than 30 μm×3 μm. This capability is provided, in accordance with the present invention and as was described above with respect to the preferred embodiment, by using laser beam 230. Although, in principle, laser beam 230 could be added to "paintbrush" 250 in any one of several ways, the placement shown in FIG. 1 provides a preferred placement wherein laser beam 210 is replaced with laser beam 230 at predetermined times. In the preferred embodiment, the minimum size of the small pel is about 5 μm×3 μm and, as a result, $D_{max-1}$ is about 2.7 for a 90 μm×90 μm pixel. Since the depth of focus required to provide a pel of a particular size is inversely proportional to the square of the pel size, a pel size of about 5 μm×3 μm is reasonable in terms of the complexity and expense involved in providing a smaller sized pel.

Further, as described above, slicing is also applied to pels written by the fourth and smallest laser beam and, as a result, the number of gray scale levels is dramatically increased, and small increments between gray scale levels are realizable. The increase in the number of gray scale levels is most advantageous at high densities because the human eye is most sensitive to transmittance or reflectance changes which occur at high density. Specifically, the human eye is sensitive to relative change in luminance as a function of dL/L where dL is the change in luminance and L is the average luminance. Thus, when the density is high, i.e., L is small, the sensitivity is high for a given dL whereas if the density is low, i.e., L is large, then the sensitivity is low for a given dL. In accordance with this, embodiments of the present invention preferably provide small steps between gray scale levels at the high density end of the gray scale. Further, in accordance with this, it is also preferred to write the high density part of the gray scale as accurately as possible because the human eye is more sensitive to intensity differences which occur in that part of the gray scale. In accordance with a preferred embodiment of the present invention, this is accomplished, as was described above, by writing "white" on the medium. As was described above, in the preferred embodiment, the medium is such that, in an unprinted or virgin state, the medium is black. The making of a copy entails the use of radiation from laser beams 200-230 to cause the copy forming substance on the medium to adhere to the surface of the web. Then, when the cover is peeled, the exposed regions remain on the web and the unexposed regions remain with cover and form the hardcopy. Since the hardcopy is written by using laser beams 200-230 to denote areas on the ultimate copy wherein black is removed, the formation of the hardcopy is referred to as a process where one "writes white." This is advantageous, as can be seen from the above, since laser beam 230 which produces the small pel is used to provide gray scale levels which corresponds to high density. The advantage is derived from the fact that the accuracy of the specification of the high density gray scale levels depends on the positioning of a single laser beam, namely, laser beam 230 which is responsible for writing the small pel. If the medium were written "black" the high density gray scale levels would be written by the interaction of several, if not all, of laser beams 200-230 and provide more opportunity for positioning error. As a result, a printer would have to be more complex and expensive to achieve a comparable level of accuracy as that achieved by a printer that utilizes a "write white" process. This is because, as was set forth above, intensity differences are more readily detected in the high density portion of the gray scale levels, and medical images typically are darker than picture photographs. Notwithstanding the above, it should be understood that the present invention is not restricted to "write white" embodiments and that the present invention also encompasses "write black" embodiments.

In a preferred embodiment of the present invention, pel configuration patterns for "painting" a 90 μm × 90 μm print pixel are designed to meet several objectives which are necessary for repeatable imaging of high quality. A first objective in developing pel configuration patterns for the preferred embodiment which "writes white" is to make as few changes in an area modulation pixel as is possible for higher density gray scale levels because the most critical information in most medical images is in the darker areas of an image. In addition, a second objective in developing pel configuration patterns is to minimize the effect of bridging in the medium on image quality. Bridging is a phenomenon that occurs in the above-described medium whenever a cover is pelled and closely spaced exposed material bridges, i.e., pulls unexposed material between them, from the cover. As one can readily appreciate, bridging will result in density variations and, hence, lower quality copies. Bridging can be prevented by utilizing pel configuration patterns which maintain minimum distances of unexposed material in the medium between clusters of exposed material. For example, we have determined that the probability of bridging, i.e., the probability that two clusters of exposed material will bridge, is reduced substantially if there is a minimum unexposed distance between the clusters of about 10 μm to 12 μm.

Figure 2A:
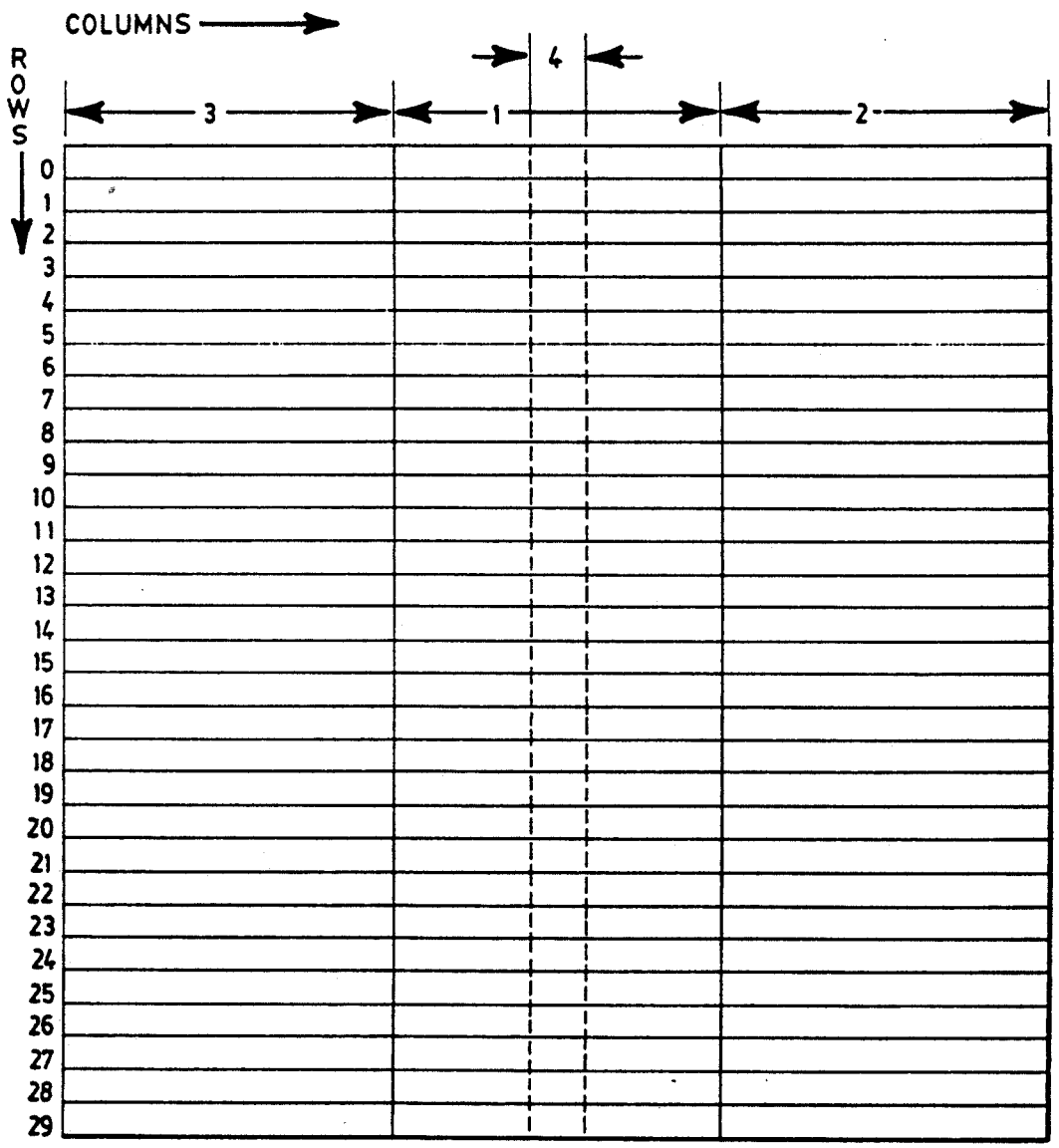
FIGS. 2A-2T show, in pictorial form, pel configuration patterns for various 90 $\mu m \times 90$ $\mu m$ pixel gray scale levels in accordance with a preferred embodiment of the present invention.
Figure 2B:
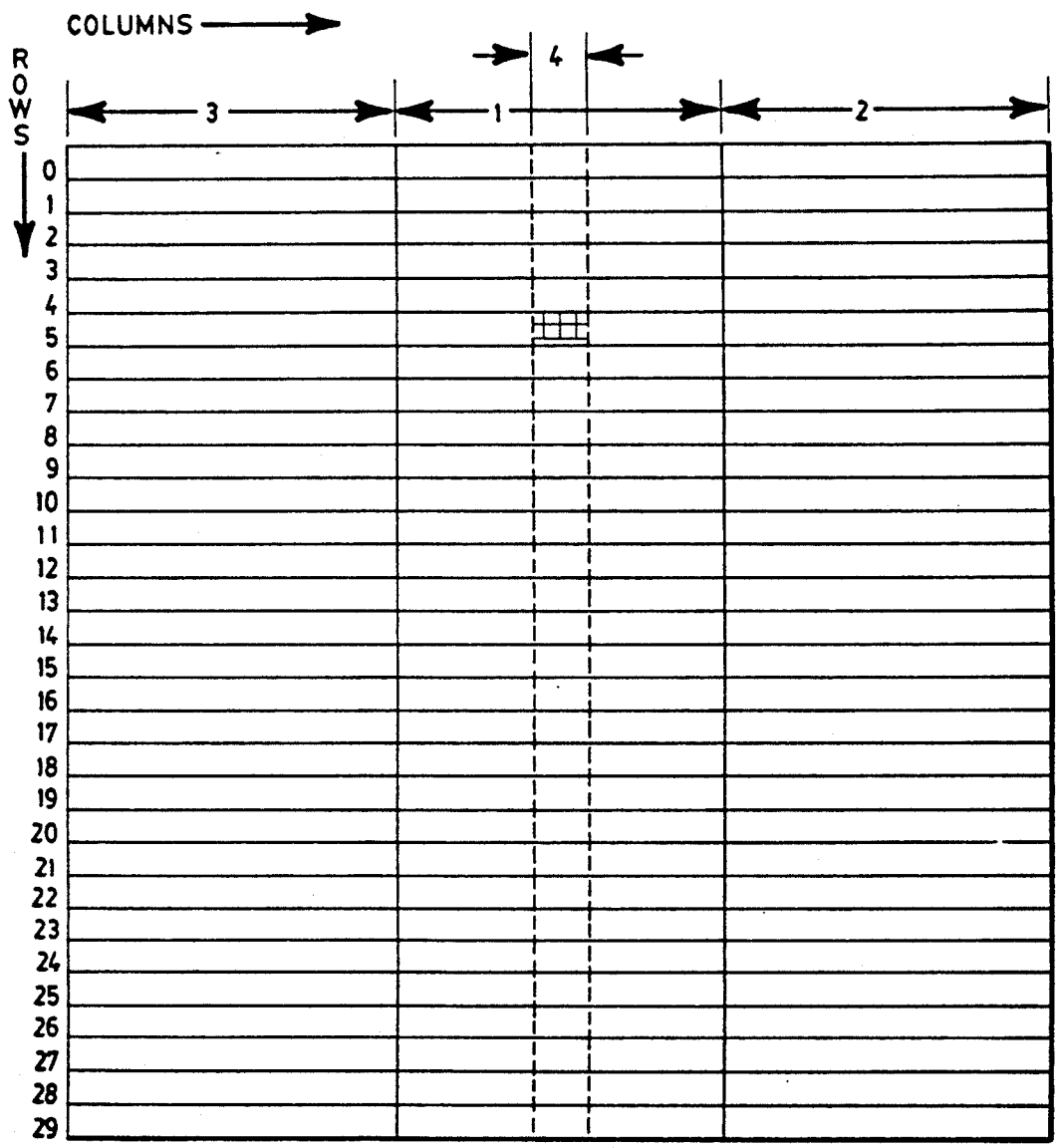
Figure 2C:
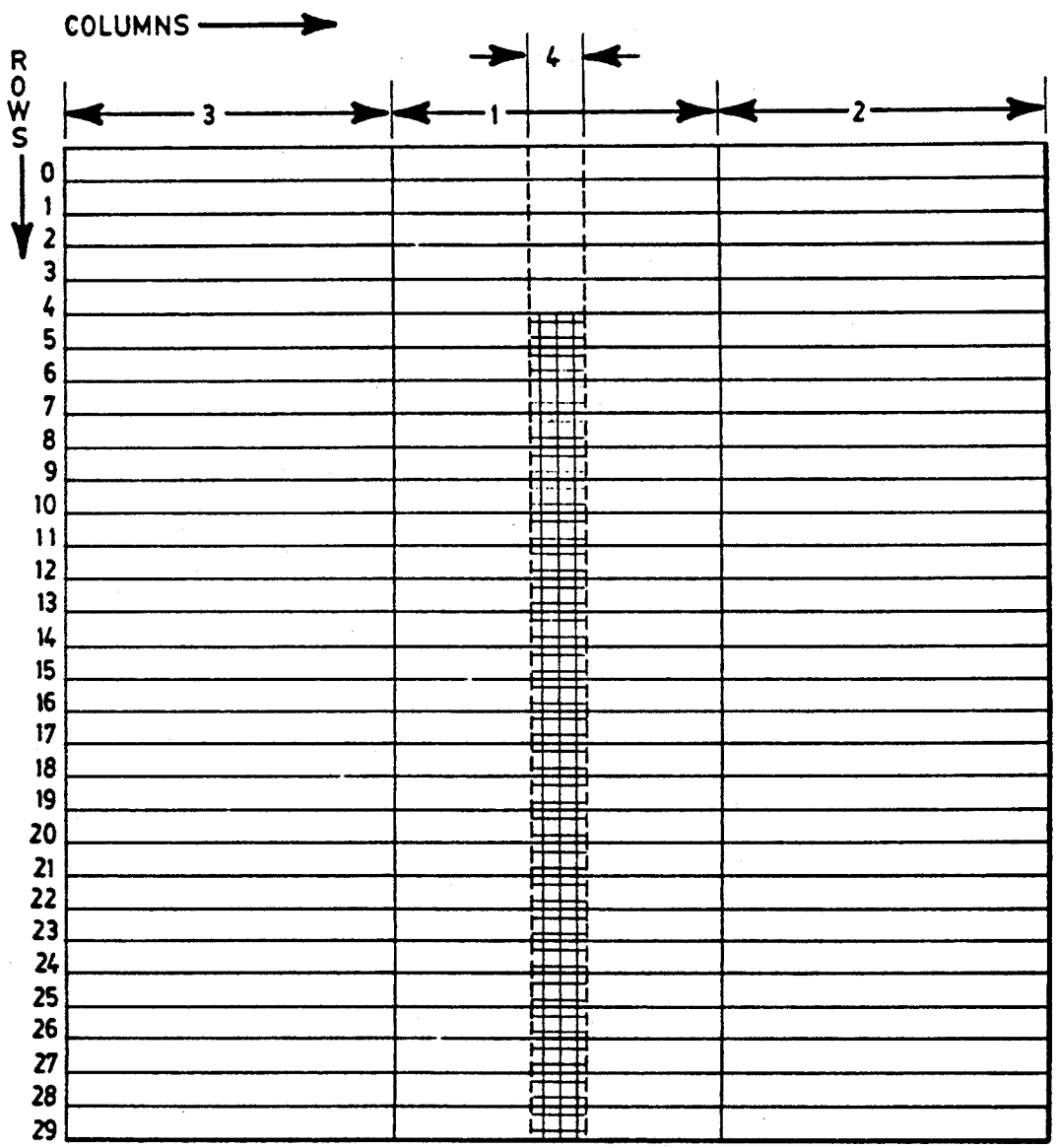
Figure 2D:
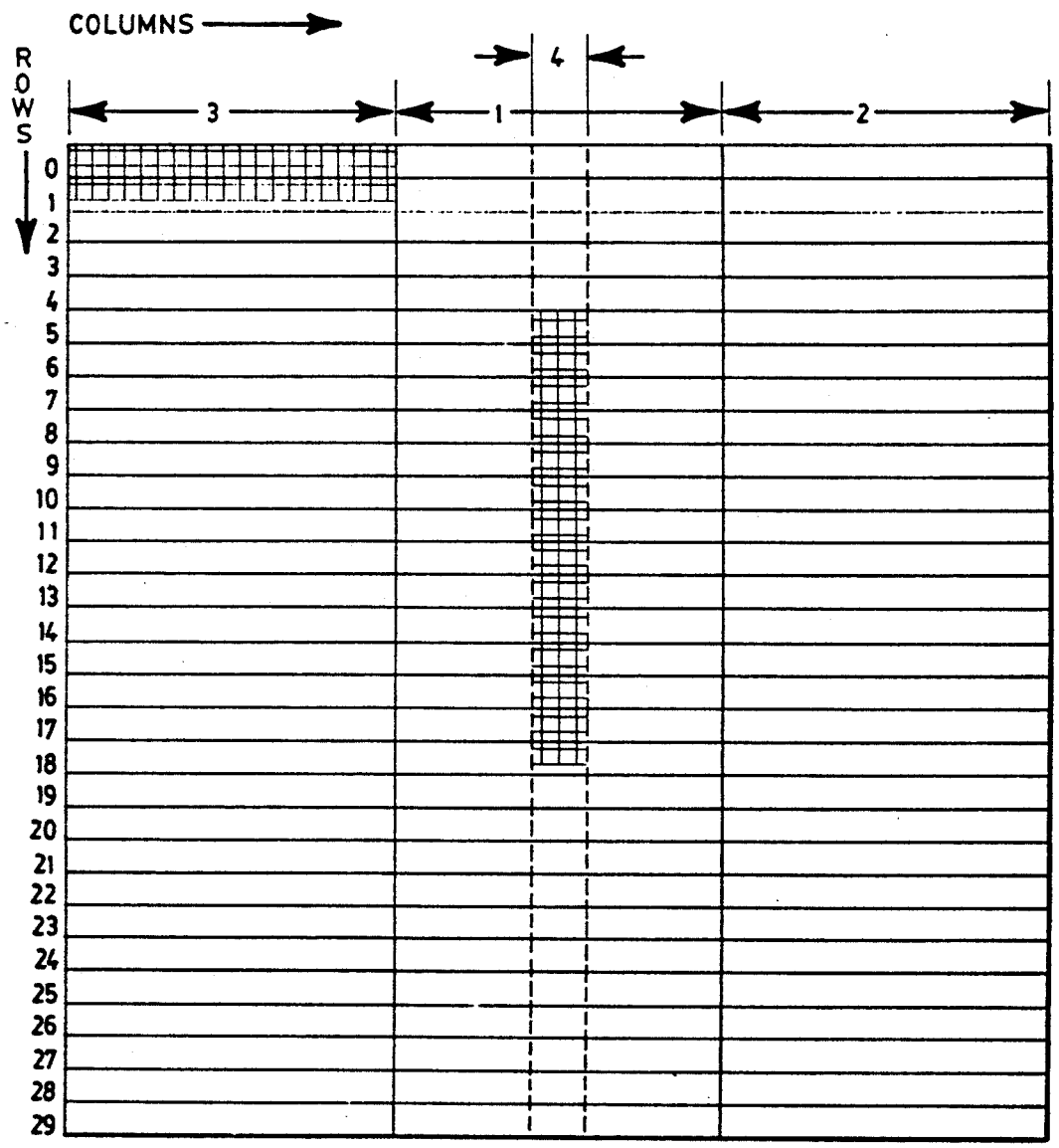
Figure 2E:
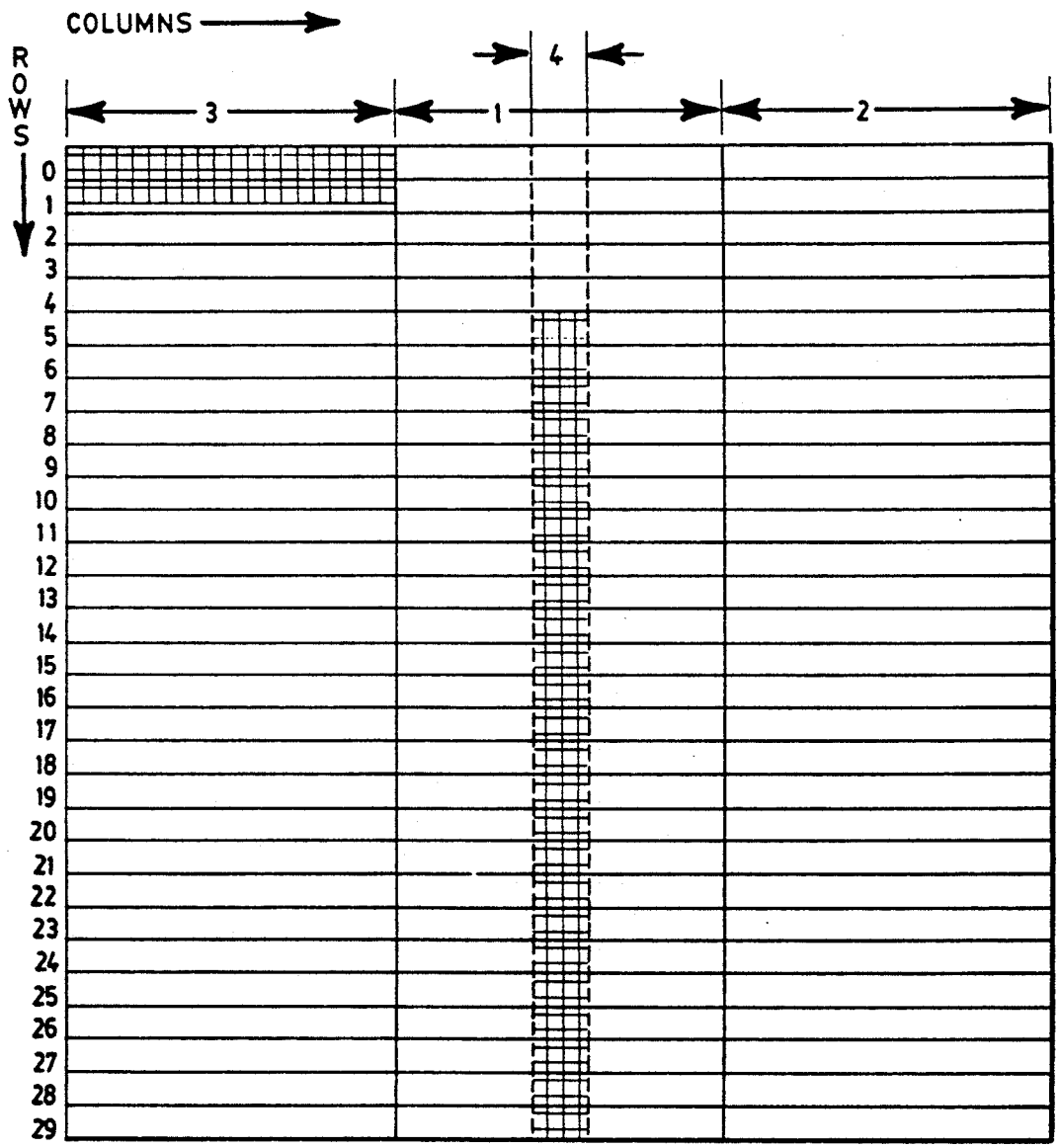
Figure 2F:
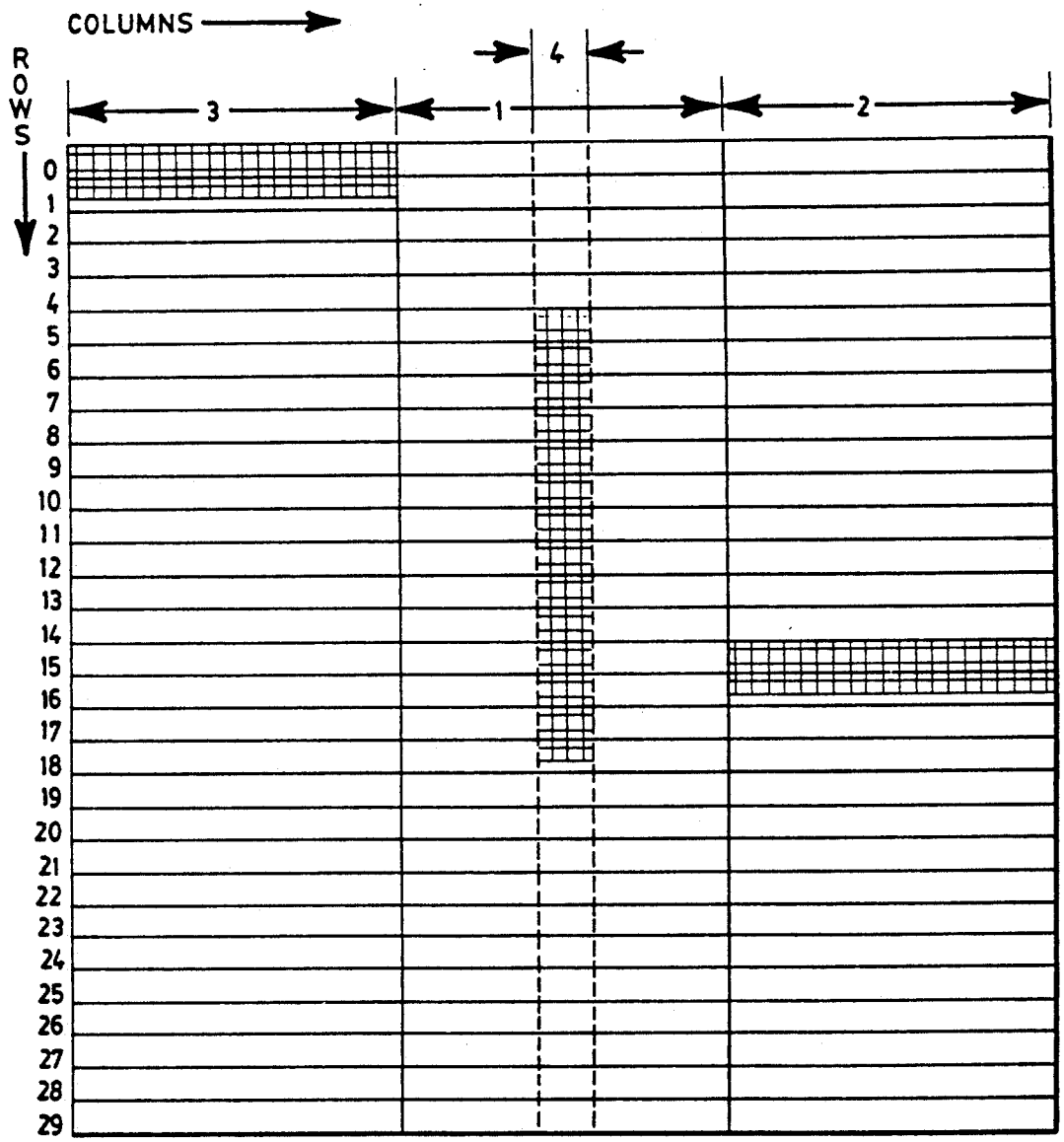
Figure 2G:
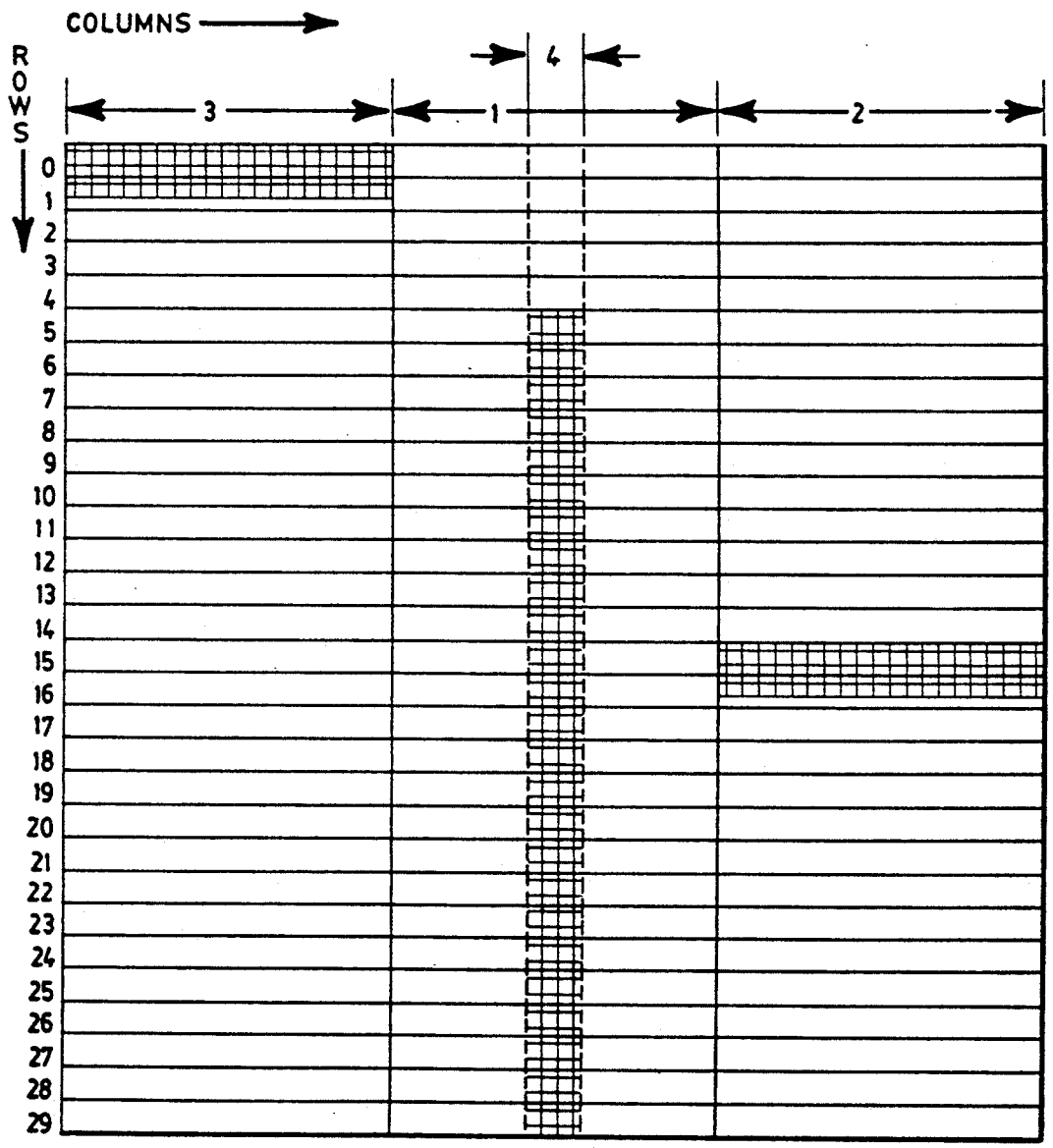
Figure 2H:
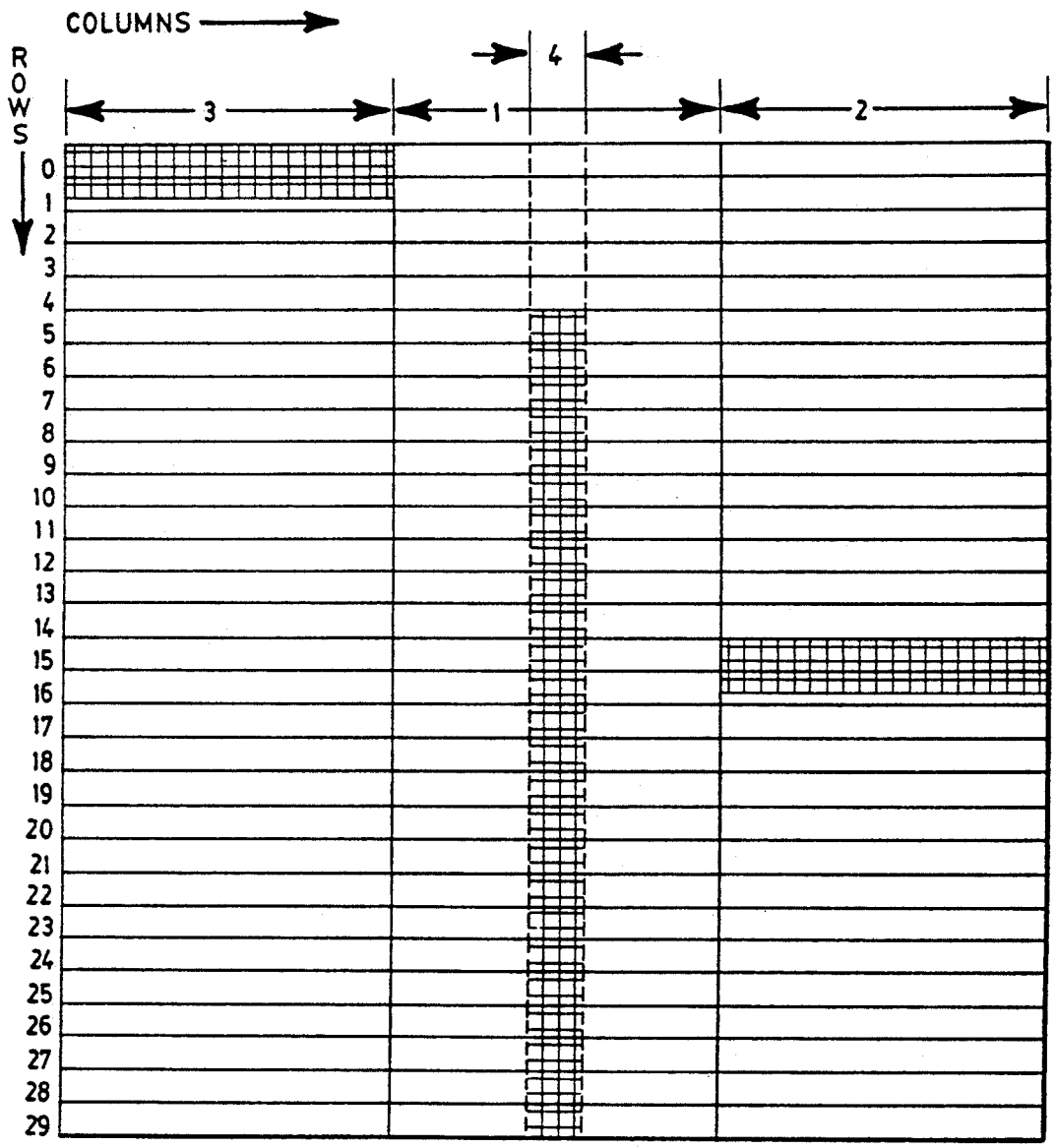
Figure 2I:
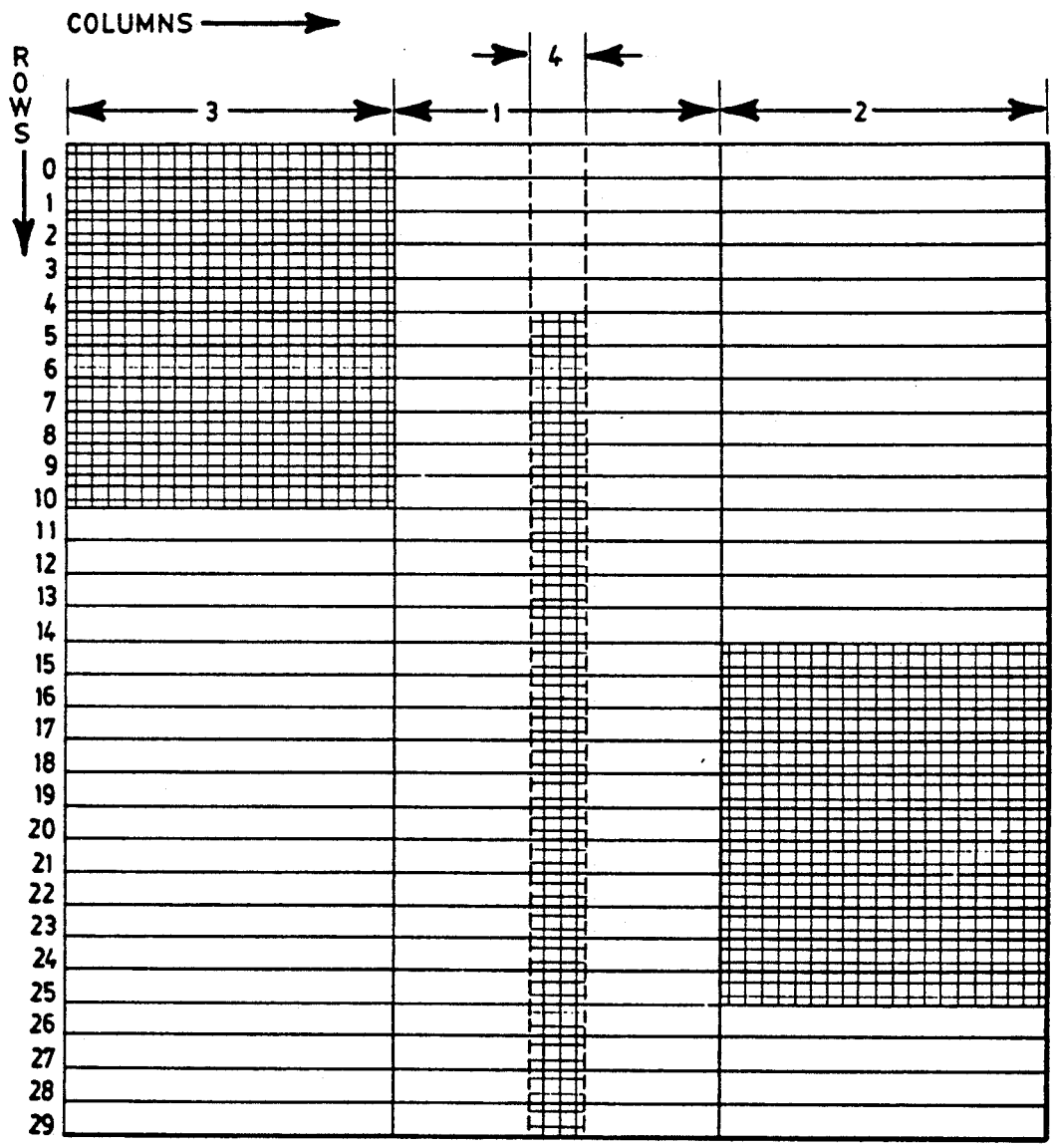
Figure 2J:
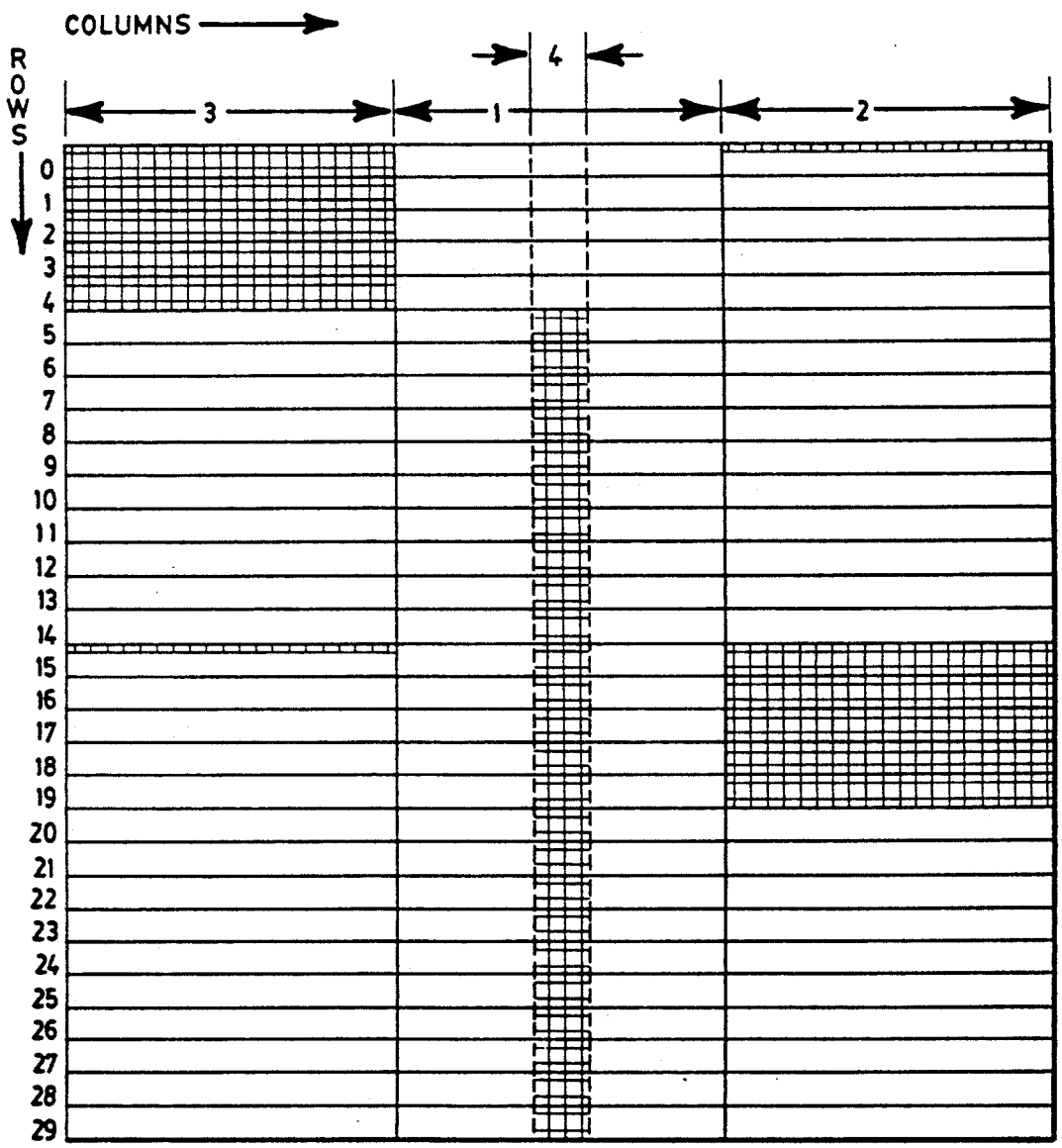
Figure 2K:
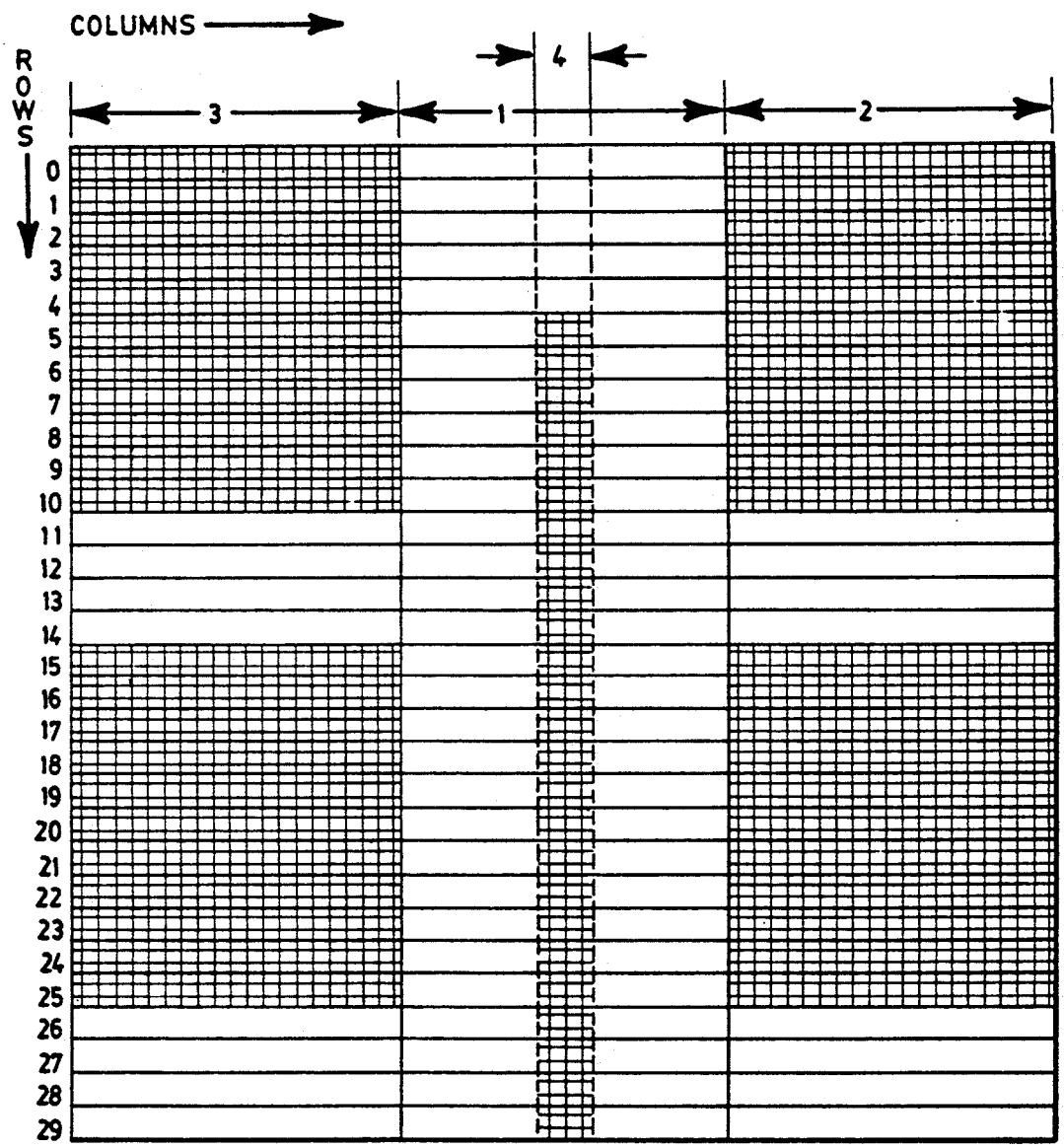
Figure 2L:
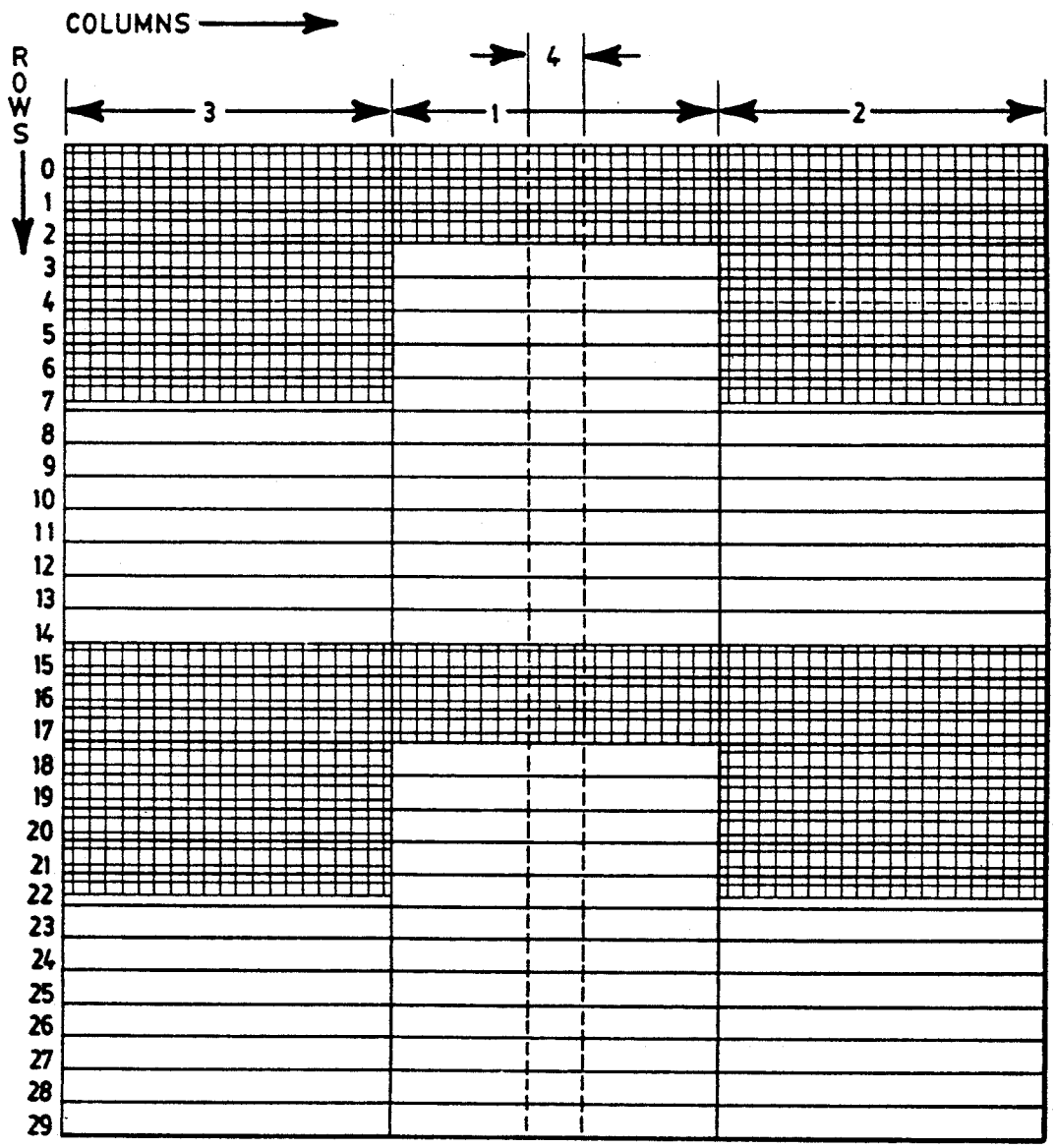
Figure 2M:
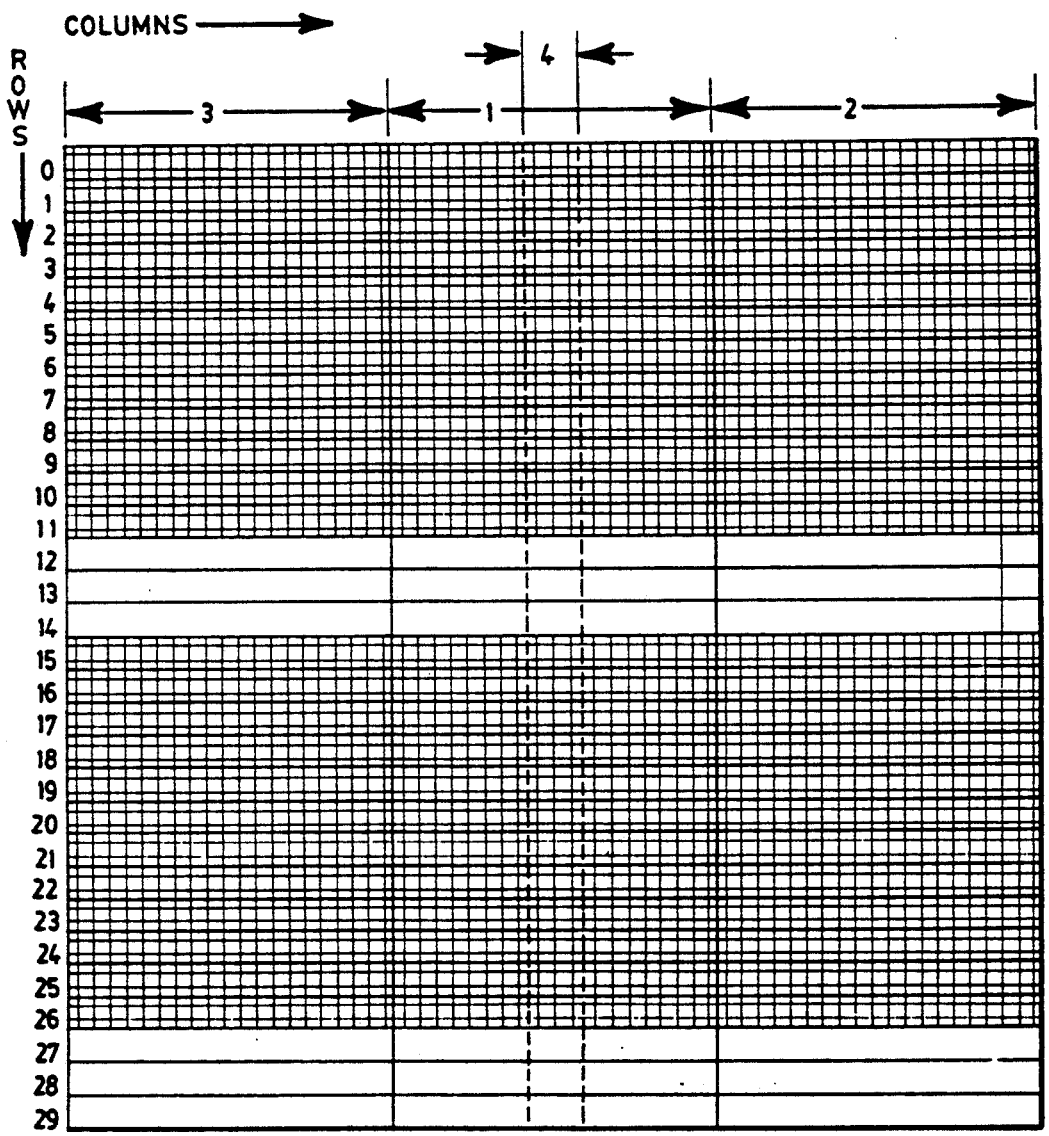
Figure 2N:
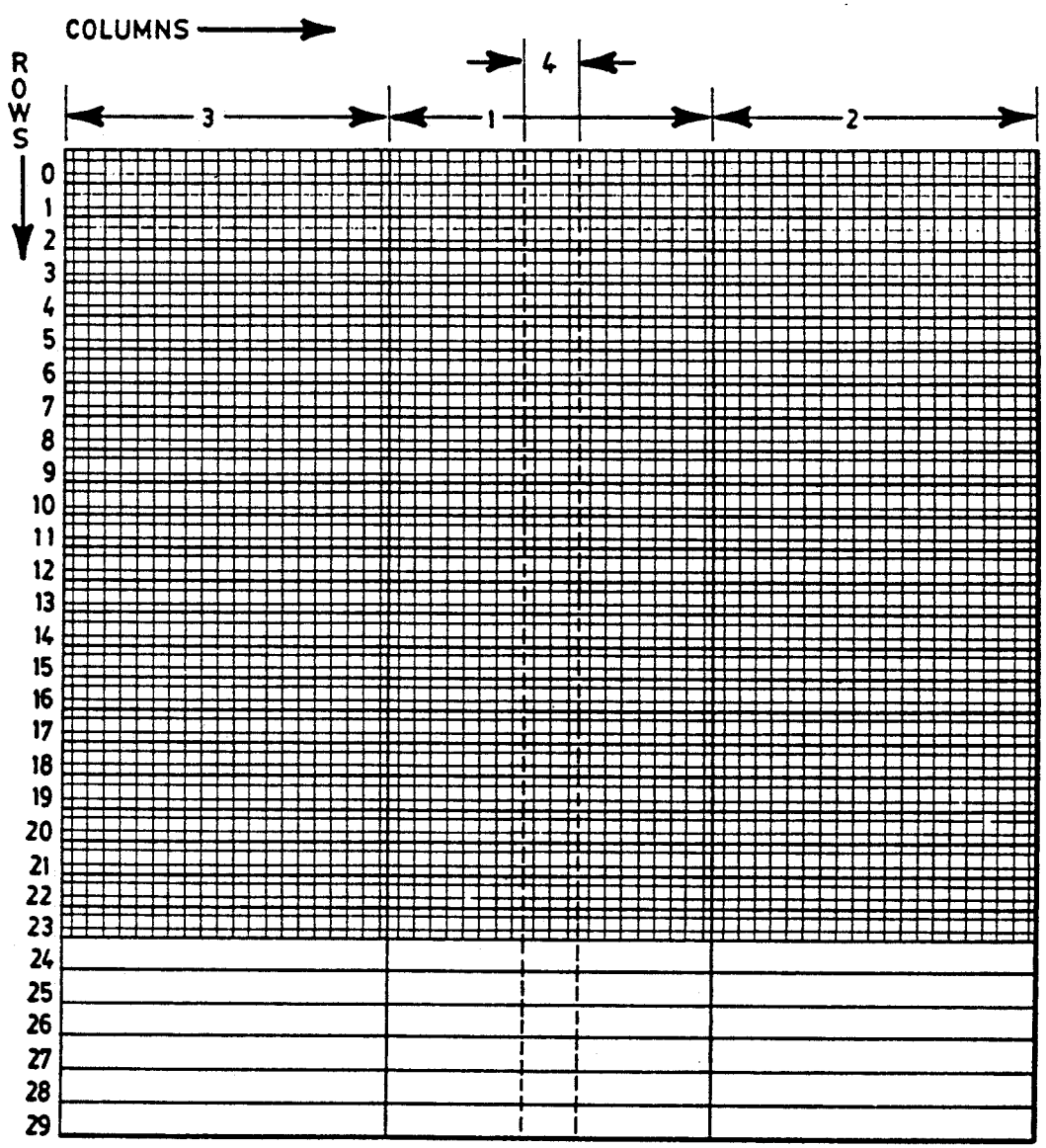
Figure 20:
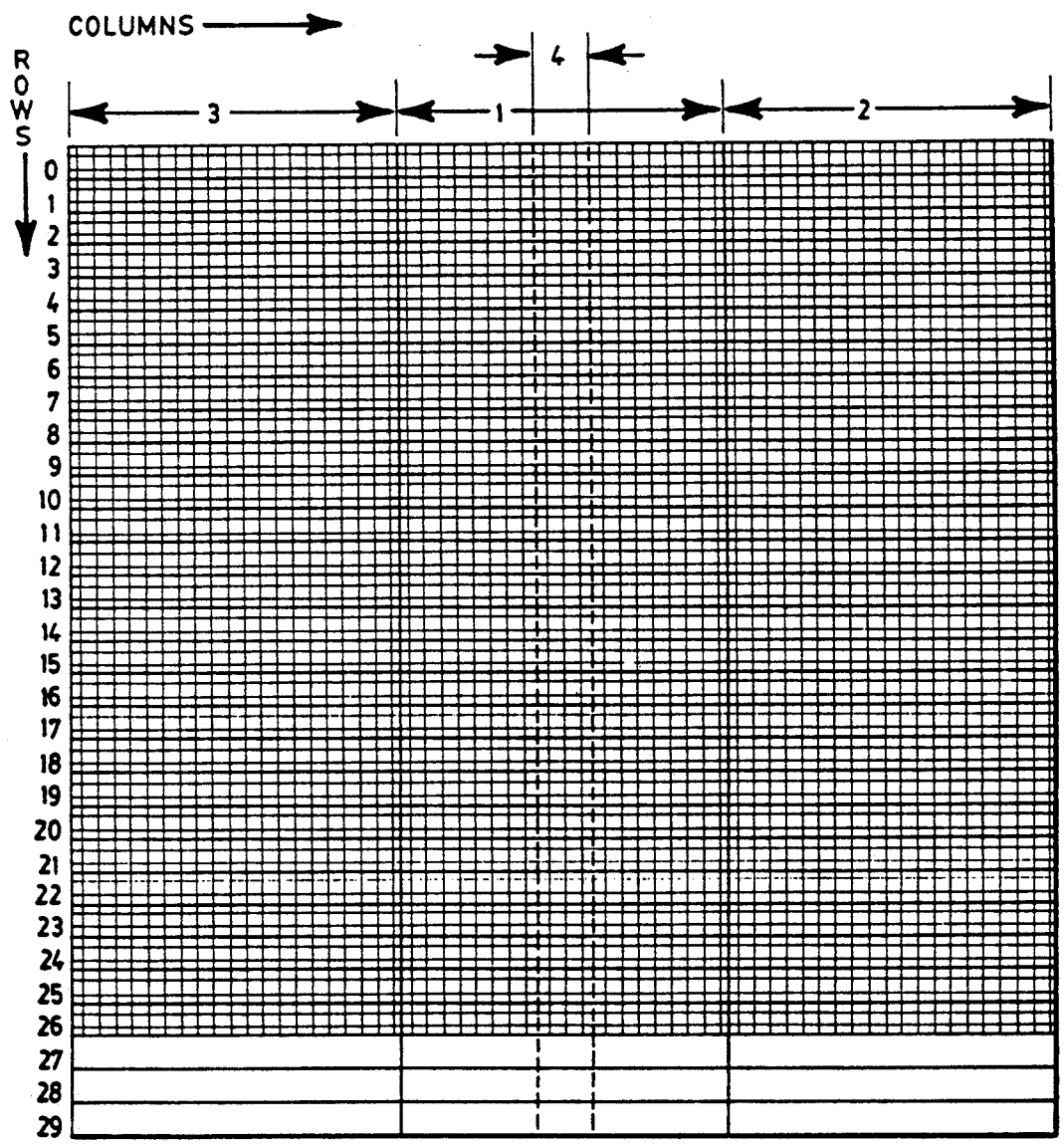
Figure 2P:
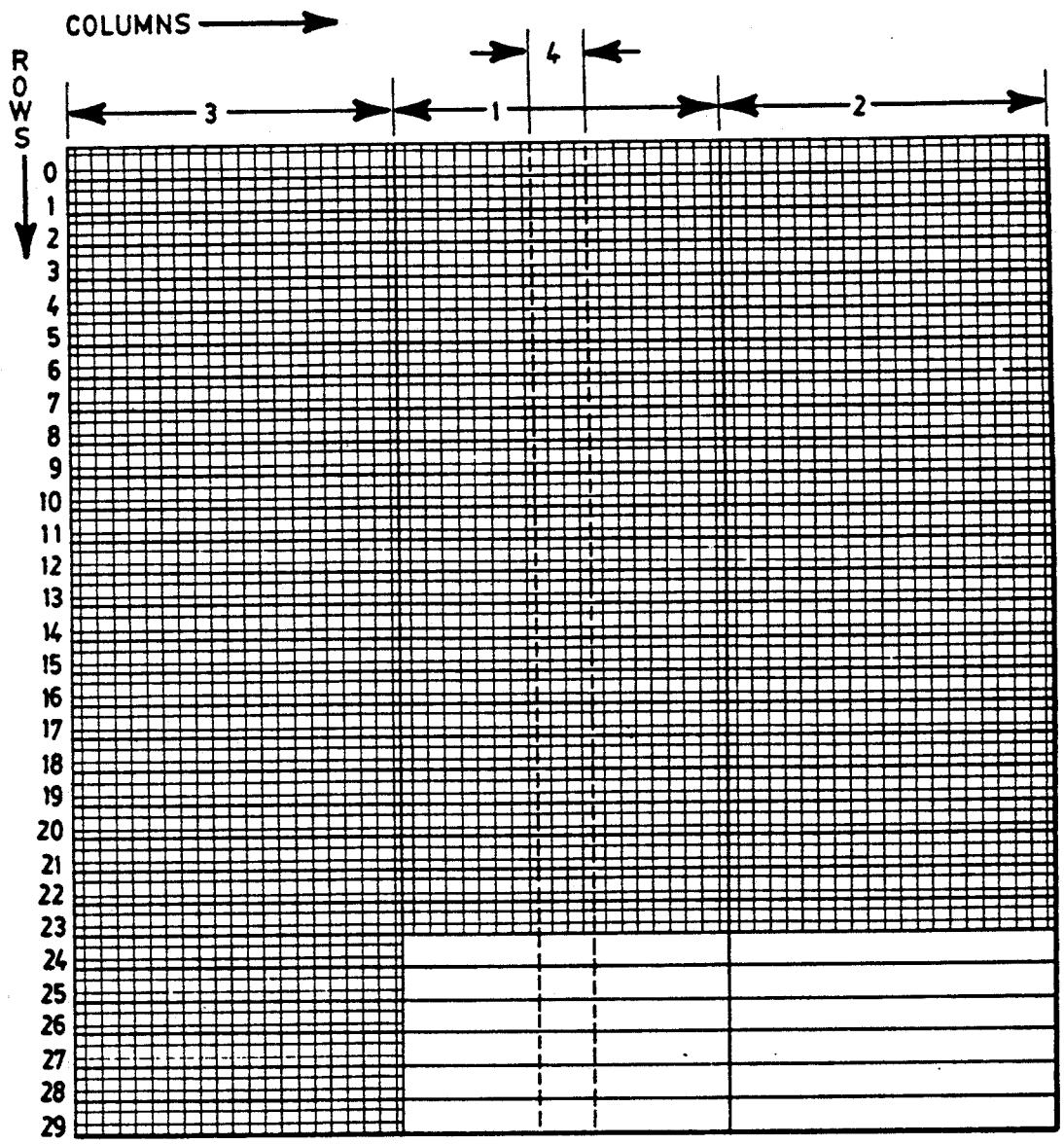
Figure 2Q:
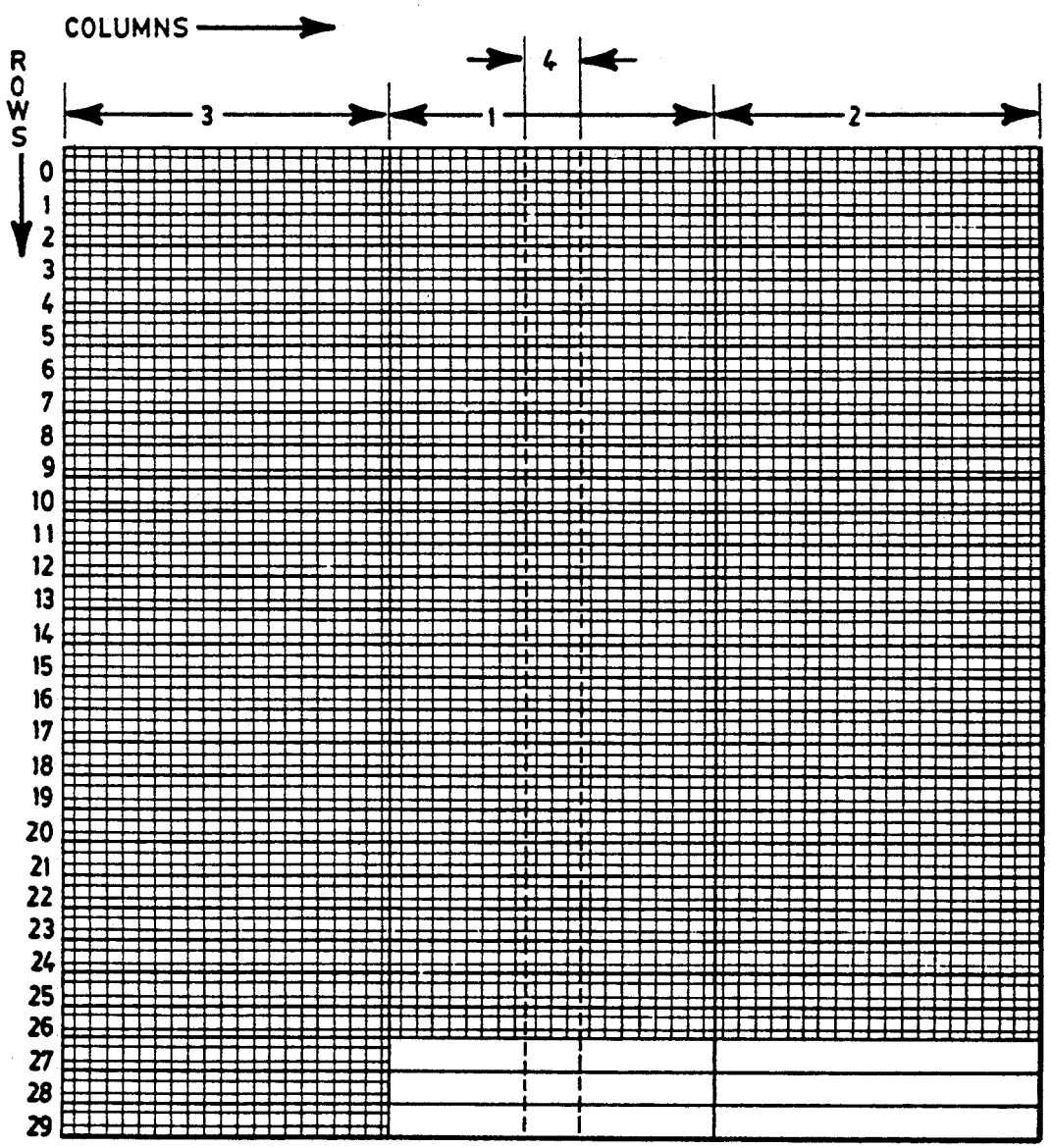
Figure 2R:
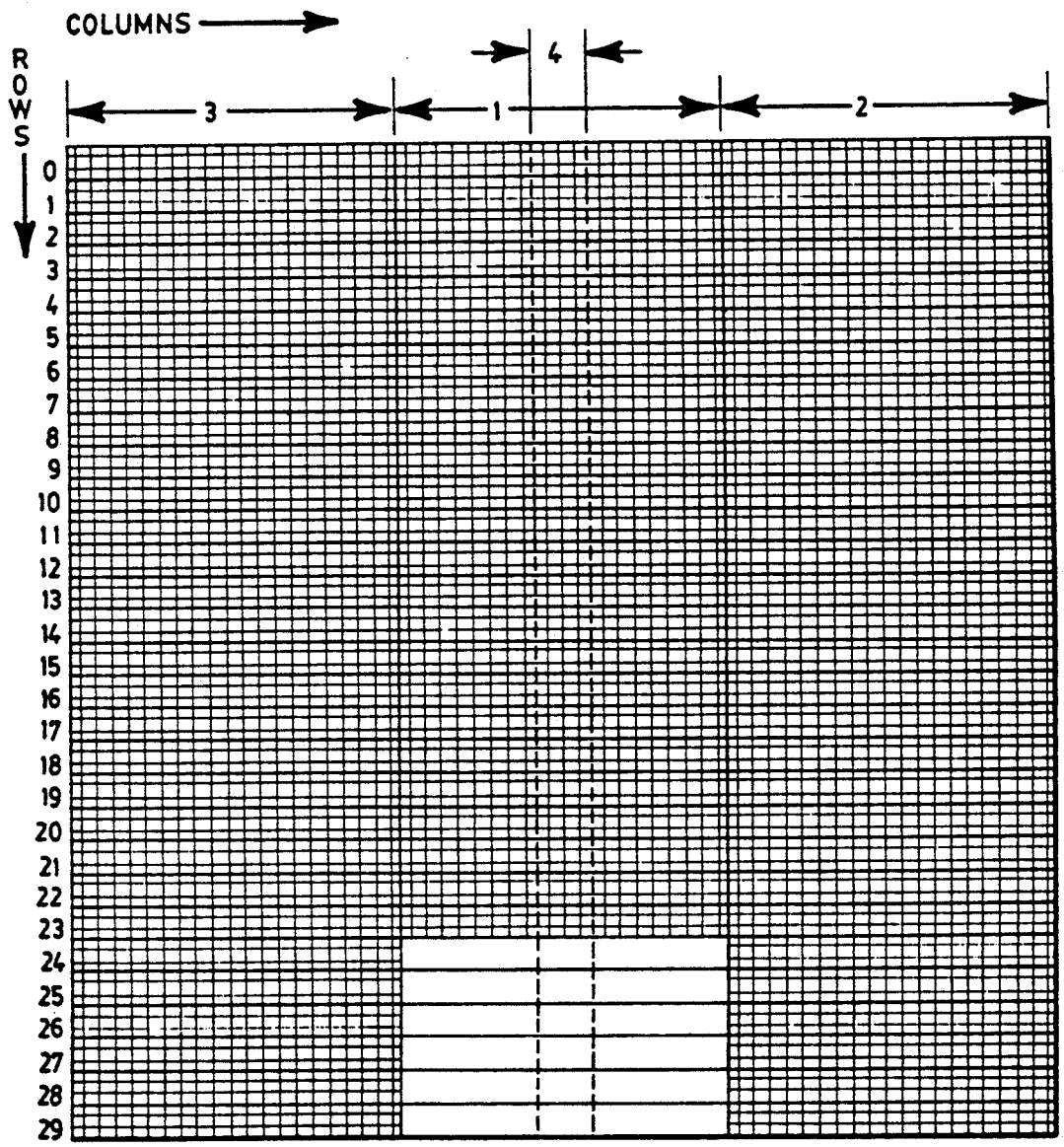
Figure 2S:
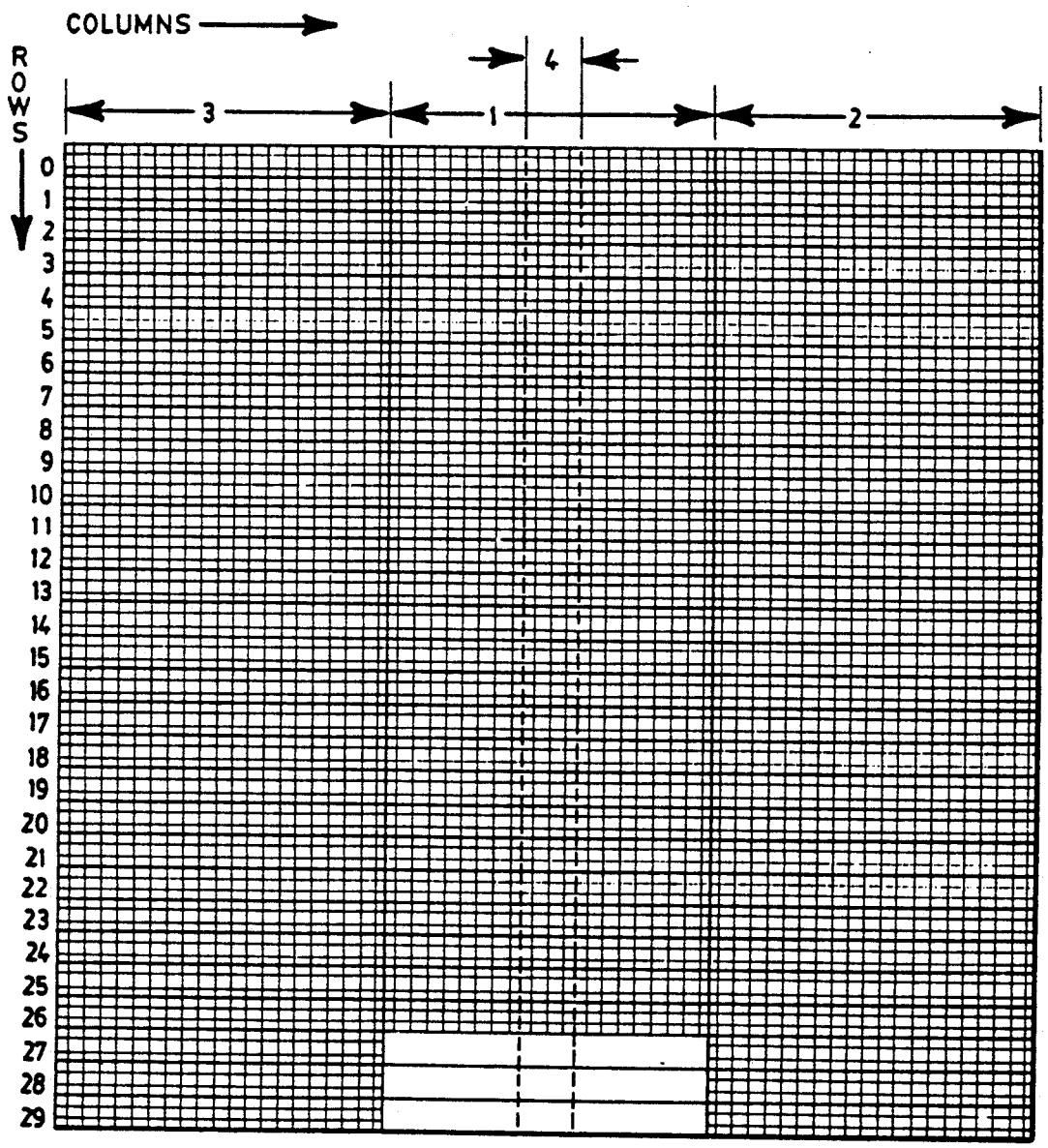
Figure 2T:
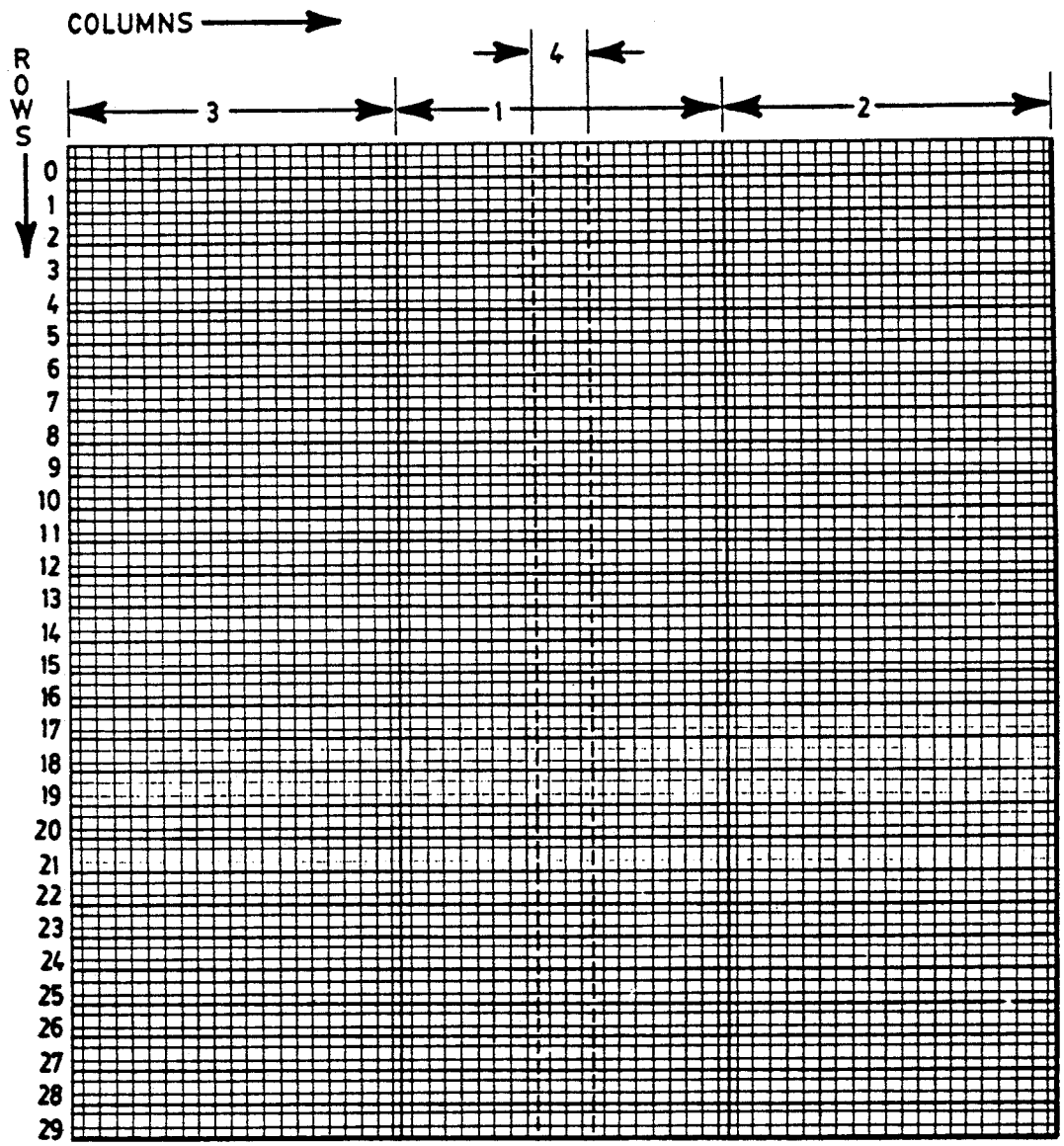

FIGS. 2A-2T show various pel configuration patterns for various 90 μm × 90 μm pixel gray scale levels in accordance with a preferred embodiment of the present invention. These figures are best understood when they are viewed in conjunction with Table 1 (see page 57).

The grid in FIGS. 2A-2T represents one 90 μm × 90 μm pixel which is comprised of 3 columns, each column being comprised of 30 rows. Pels in the first column are "painted" by wide laser 3; pels in the second or middle column are "painted" by wide laser 1 or by narrow laser 4; and pels in the third or last column are "painted" by wide laser 2. The coordinates of a particular pel in the grid are designated, as to row, by a number from 0-29 and, as to column, by the laser number which "paints" that pel. In viewing FIGS. 2A-2T, keep in mind that we are viewing a "negative" of a "write white" medium, i.e., the white areas in the figures are unexposed areas and the black areas are "painted" areas. Thus, the hardcopy will be the reverse of the figures. For example, FIG. 2A shows a "negative" of a completely unexposed medium and, as a result, represents a pixel having the darkest gray scale level.

In providing pel configuration patterns for the preferred embodiment in accordance with the above-described criteria, we have divided the pel configuration patterns into groups A through J and we have specified certain "painting" rules for the various groups. The rules are displayed in TABLE 1 and are illustrated in FIGS. 2B-2T. In particular, pairs of figures from FIGS. 2B-2T show the starting pel configuration pattern for a group and the last pel configuration pattern in a group, respectively. Specifically, with reference to TABLE 1: the column headed "GROUP" refers to pel configuration patterns in the various groups A-J; the column headed "BEGINNING OF CLUSTER LOCATION" gives grid coordinates in terms of row and laser for pels in the first pel configuration pattern in a group; and the column headed "CLUSTER SIZE RANGE IN SLICES" gives the minimum and maximum number of slices for each of the lasers used to produce pel configuration patterns in a group. Table 1 and FIG. 2B show that the first pel configuration pattern in group A comprises 6 slices "painted" by laser 4 starting in row 5. Further, TABLE 1 and FIG. 2C show that the last pel configuration pattern in group A comprises 200 slices "painted" by laser 4 starting in row 5. TABLE 1 and FIG. 2D show that the first pel configuration pattern in group B comprises 110 slices "painted" by laser 4 starting in row 5 and 12 slices "painted" by laser 3 starting in row 0. Further, TABLE 1 and FIG. 2E show that the last pel configuration pattern in group B comprises 200 slices "painted" by laser 4 starting in row 5 and 12 slices "painted" by laser 3 starting in row 0. TABLE 1 and FIG. 2F show that the first pel configuration pattern in group C comprises 110 slices "painted" by laser 4 starting in row 5, 12 slices "painted" by laser 3 starting in row 0, and 12 slices "painted" by laser 2 starting in row 15. Further, TABLE 1 and FIG. 2G show that the last pel configuration pattern in group C comprises 200 slices "painted" by laser 4 starting in row 5, 12 slices "painted" by laser 3 starting in row 0, and 12 slices "painted" by laser 2 starting in row 15. The remaining ones of FIGS. 2B-2T can be similarly understood with reference to TABLE 1.

Note that groups F-J which correspond to lower densities do not use small laser 4. However, this is not a drawback since, as was described above, the logarithmic human visual response means that larger transmission or reflection differences in regions of low density can still be nearly invisible to the human eye.

As one can readily appreciate from the above, FIGS. 2A-2T and TABLE 1 provide more pel configuration patterns than would be used to provide, for example, 256 gray scale levels. Thus, in practice, an appropriate subset of the various pel configuration patterns provided in FIGS. 2A-2T and TABLE 1 for use in a specific case depends on the particular requirements of the specific case and, an appropriate subset therefor, is selected to approximate the specific tone scale desired. However, one may consider the following methodology for choosing pel configuration patterns from among the various possibilities in a group. First, consider the first pel configuration pattern for a group and, for each laser, determine the amount of area that can be "painted" to reach the last pel configuration pattern for the group. Second, pel configuration patterns from that group, other than the first pel configuration pattern, are first selected as being those which are obtained by "painting" with the laser that has the largest area that can be "painted." However, as the selected laser "paints" to provide selected pel configuration patterns, the amount of area that can be "painted" for that laser is decreased. Third, when the amount of area that can be "painted" by the first laser equals the amount of area that can be "painted" by another laser, pel configuration patterns are then chosen which alternately "paint" these two lasers.

The laser source which is used to provide a beam to write the small pel may be similar to those used to provide a beam to write the large pels, but with its radiation output clipped using mirrors of appropriate dimensions. Alternatively, one could utilize a laser having a smaller emitting region.

Figure 3:
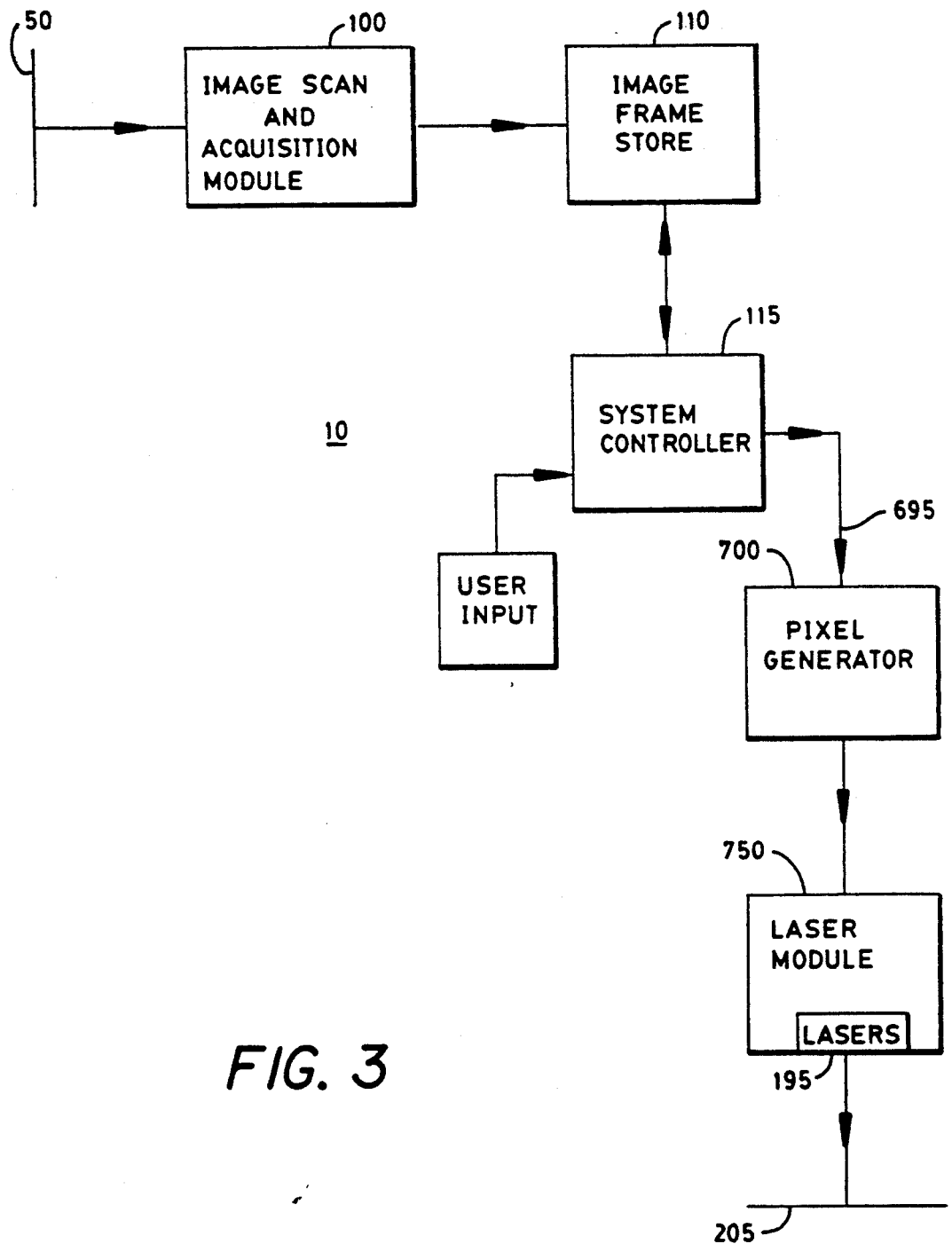
FIG. 3 shows a block diagram of an embodiment of the present invention.

FIG. 3 shows a block diagram of inventive printer 10 which produces a hardcopy of image 50 on medium 205. As shown in FIG. 3, printer 10 comprises: (a) Image Scan and Acquisition Module 100 which acquires image data in electronic form corresponding to image 50; (b) Image Frame Store 110 which stores the image data provided by Image Scan and Acquisition Module 100; (c) System Controller 115 which: (i) processes the image data stored in Image Frame Store 110 in a manner which will be described in detail below, (ii) causes the processed image data, and other information that will be described in detail below, to be transferred to other portions of printer 10, and, in certain embodiments, (iii) receives input information from a user to provide printing format information and the like; (d) Pixel Generator 700 which receives image data from Image Frame Store 110 and control information from System Controller 115 and, in response thereto, produces output to Laser Module 750; and (e) Laser Module 750 which comprises Lasers 195, which lasers produce a hardcopy of image 50 on medium 205 in response to the output from Pixel Generator 700.

Image Scan and Acquisition Module 100 is apparatus which is well-known to those of ordinary skill in the art for scanning image 50, for acquiring image data from image 50 in analog or digital form, and for converting the acquired image data into digital form; if necessary. Embodiments of Image Scan and Acquisition Module 100 are well-known to those of ordinary skill in the art and comprise, for example, apparatus: (a) for scanning image 50 with radiation output from, for example, a CRT; (b) for measuring the amount of radiation which is reflected from image 50 and/or which is transmitted by image 50 with photodetectors in a manner which is also well-known to those of ordinary skill in the art; and (c) for converting, for example, output from the photodetectors to digital image data by sending the output through, for example, analog-to-digital converters in a manner which is also well-known to those of ordinary skill in the art. Alternatively, Image Scan and Acquisition Module 100 may be a CCD scanner. In the embodiment described below, for purposes of illustration only and without limitation, it is assumed that the digital image data output from Image Scan and Acquisition Module 100 comprises eight (8) bit data, each of which corresponds to a 256 step gray scale. Further, also for purposes of illustration only and without limitation, each eight-bit image datum corresponds to the intensity of the radiation which was reflected from a predetermined area of image 50 or which was transmitted by a predetermined area of image 50. In addition, it should be clear to those of ordinary skill in the art that image data which is output from Image Scan and Acquisition Module 100 and which is applied as input to Image Frame Store 100 under the control of System Controller 115 could just as well have been read from a storage medium such as, for example, a video tape, an optical disk, a magnetic disk, and so forth and, in such an embodiment, the output from the storage device would be applied as input to Image Frame Store 110. Alternatively, the digital image data could also be generated at a remote location and transferred to Image Frame Store 110 over a Local Area Network (LAN) or through a small computer system interface (SCSI), and so forth. It should be understood that the image does not have be stored in any one particular digital or analog format, and it is well within the spirit of the present invention to accept image information in any type of format.

It should be understood that each image datum output from Image Scan and Acquisition Module 100 can be displayed on an area which could be larger than, equal to, or less than the size of a pixel. For example, the particular choice may be made on the basis of format versus content—the term "format" referring to, for example, the aspect ratio of the copy and the term "content" referring to the resolution and tone of the copy. As shown in FIG. 3, in certain embodiments, such choices may be entered by user input to System Controller 115. However, in the embodiment described below, for purposes of illustration only and without limitation, an area corresponding to an image datum on image 50 is ordinarily larger than a pixel and thus of lower spatial resolution. As a result, there are more pixels in the hardcopy produced by inventive printer 10 than there are areas in image 50. Further, for purposes of illustration only and without limitation, medium 205 is affixed to the outer surface of a drum (not shown), which drum, as is well-known to those of ordinary skill in the art, is cylindrical in shape. In a typical such implementation, as is also well-known to those of ordinary skill in the art, as the drum and the medium affixed thereto rotate, radiation output from Lasers 195 in Laser Module 750 impinges upon medium 205 along a line. Still further, a sufficient number of lines are formed on medium 205 to provide the hardcopy of image 50 on medium 205 as radiation output from Lasers 195 of Laser Module 750 is moved in a direction which is transverse to the direction of a line. Yet still further, a page of hardcopy output may comprise several images which are reproduced on, for example, an 8×10 inch hardcopy and the pixel size, pixel aspect ration, number of active lines per page in, for example, the 8-inch direction, and the number of active pixels per page in the 10-inch direction are programmably variable and embodiments of the present invention are not limited to any one particular set of such parameters.

Image Frame Store 110 is any apparatus which is well-known to those of ordinary skill in the art which will serve as temporary storage for image data obtained from image 50 or from a multiplicity of such images. System Controller 115 composes and formats a "page'—which "page" is to be produced as a hardcopy image on medium 205—in Image Frame Store 110 in a manner which is well-known to those of ordinary skill in the art. As a result, a "page" may be comprised of a single image like image 50 or it may be comprised of a multiplicity of images like image 50.

System Controller then transfers the following to pixel generator 700 preferably over a VME Bus 695 as setup data which is used by Pixel Generator 700 in performing its function: (a) values for certain programmable parameters of Pixel Generator 700—such as, for example: (i) number of lines per page; (ii) number of pixels per line in the direction of rotation of the drum; (iii) number of pels per pixel in the direction of the rotation of the drum; (iv) pixel aspect ratio; and so forth; (b) look-up table data which is used to generate signals for driving Laser Module 750 in a manner which will be described in detail below; and (c) software for use by a digital signal processor (DSP) which comprises a portion of Pixel Generator 700. It should be clear to those of ordinary skill in the art that, in some embodiments, such data and software can be transferred prior to making each hardcopy image whereas, in other embodiments, portions of such data and software may be transferred whenever the relevant data and software or portions thereof need to change for various portions of the hardcopy.

Figure 4:
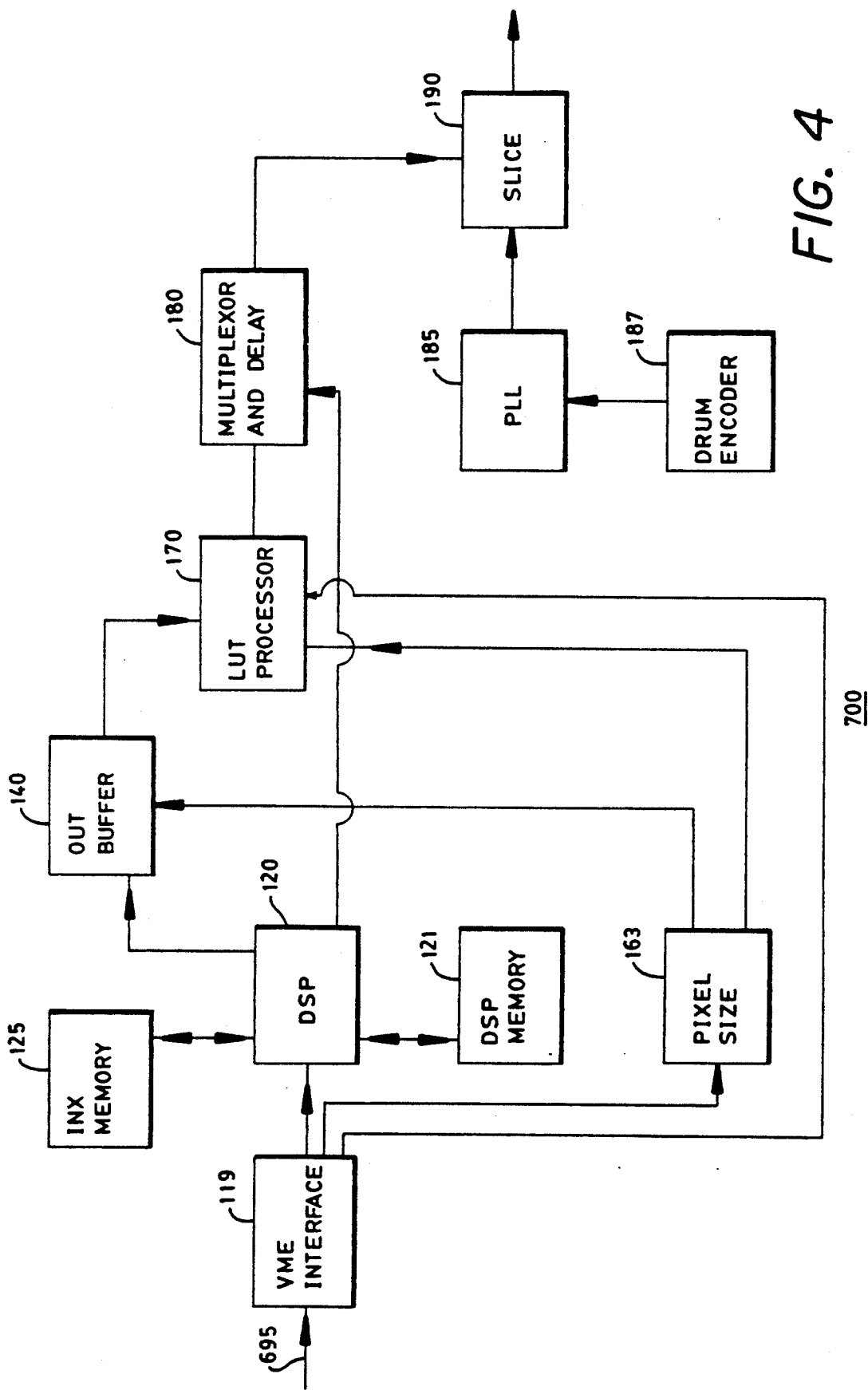
FIG. 4 shows a block diagram of a pixel generator which is fabricated in accordance with the present invention.

As shown in FIG. 4, Pixel Generator 700 is comprised of the following components: (a) VME Interface 119-VME Interface 119 receives input over VME Bus 695 and provides an interface between the internal circuitry of Pixel Generator 700 and VME Bus 695; (b) DSP 120-DSP 120 receives parameter data, software, and image data from System Controller 115 (this data and information is sent from System Controller 115 to VME Interface 119 over VME Bus 695 and is relayed by VME Interface 119 to DSP 120); (c) DSP Memory 121-DSP Memory 121: (i) receives parameter data and software from System Controller 115 (this data and information is sent from System Controller 115 to VME Interface 119 over VME Bus 695, is relayed by VME Interface 119 to DSP 120, and is finally relayed to DSP 121 by DSP 120) and (ii) transfers parameter data and software to DSP 120; (d) INX Memory 130-INX Memory 130: (i) receives image data from System Controller 115 (this image data is sent from System Controller 115 to VME Interface 119 over VME Bus 695, is relayed by VME Interface 119 to DSP 120, and is finally relayed to INX 125 by DSP 120) and (ii) transfers image data to DSP 120 in response to commands from DSP 120 (e) Out Buffer 140-Out Buffer 140: (i) receives image data from DSP 120; (ii) receives addressing information from Pixel Size 163; and (iii) transfers image data to LUT Processor 170; (f) Pixel Size 163-Pixel Size 163: (i) receives parameter data (such as, for example, number of lines per page, the number of pixels per line in the direction of drum rotation, and the number of pels per pixel in the direction of drum rotation) from System Controller 115 (this data is sent from System Controller 115 to VME Interface 119 over VME Bus 695 and is relayed by VME Interface 119 to Pixel Size 163); and (ii) transfers pixel address information to Out Buffer 140 and pel address information to LUT Processor 170; (g) LUT Processor 170 which is comprised of look-up table memories LUT0 and LUT1 (it should be clear to those of ordinary skill in the art that LUT Processor 170 is not restricted to two memories and can be comprised of only one memory or even more than two memories), each of which memories contain look-up tables which provide a mapping of intensity level to pel configuration pattern for use in digital area modulation printing on medium 205-LUT Processor 170: (i) receives mapping data from System Controller 115 (this data is sent from System Controller 115 to VME Interface 119 over VME Bus 695 and is relayed by VME Interface 119 to LUT Processor 170); (ii) intensity level input from Out Buffer 140; and (iii) pel address information from Pixel Size 163; (h) Multiplexer and Delay 180-Multiplexer and Delay 180: (i) receives input from LUT Processor 170 which contains laser drive information in 16 bit words, which 16 bit words are comprised of four 4-bit values for each of the four lasers which comprise Lasers 195 and (ii) receives input from DSP 120 which contains information which is used to determine how to convert the mapping information in the two 16 bit words from LUT0 and LUT1 of LUT Processor 170 to 16 bits of information appropriate for specific ones of Lasers 195; (i) Slice 190 -Slice 190 (i) receives input from PLL 185; (ii) receives 16 bit input from Multiplexer and Delay 180; and (iii) transforms the 16 bit input signals into signals for use in driving the lasers of Lasers 195; (j) PLL 185-PLL 185 is a phase-locked loop clock which: (i) receives input from Drum Encoder 187 and (ii) outputs a clock which is synchronized to the rotating drum; and (k) Drum Encoder 187 which receives a signal when the drum rotation reaches a predetermined position.

The following describes the operation of Pixel Generator 700 in more detail. System Controller 115 obtains data which corresponds to a portion of an image which has formatted and stored in Image Frame Store 110. System Controller 115 transfers the eight bit data corresponding to the portion to Pixel Generator 700 over VME Bus 695 in real time. The term "real time" means that, for example, data corresponding to the portion—such as one or two lines of the formatted image in Image Frame Store 110—are transferred to and processed by Pixel Generator 700 per drum revolution. Specifically, for an 8×10 inch copy printed using $60\mu \times 60\mu$ pixels, the maximum number of eight bit pixels which are transferred per line in the preferred embodiment is 4096.

The eight bit pixel data which is transferred from System Controller 115 to Pixel Generator 700 is transferred over VME bus 695, through VME Interface 119, and is applied as input to digital signal processor 120 (DSP 120). DSP 120 then transfers the data, in turn, to INX Memory 125. INX Memory 125 is apparatus which is well-known to those of ordinary skill in the art for storing digitized image data. For example, INX Memory 125 may be a random access memory. INX Memory 125 is used as input buffer memory to store image data which is waiting to be processed by DSP 120. INX Memory 125 may hold several lines of image data but typically it does not hold an entire "page."

In due course, DSP 120 obtains image data from INX Memory 125, processes it, and stores the processed data in Out Buffer 140. Embodiments of DSP 120 are well-known to those of ordinary skill in the art. For example, in a preferred embodiment of the present invention, DSP 120 is a Motorola 56001 digital signal processor. DSP 120 accesses DSP Program Memory 121, for example, a RAM memory device, to obtain software which guides DSP 120 in converting the input digitized image data into a form which is compatible with the output format required for making the hardcopy, i.e., to convert the "area-sized" image data into "pixel-sized" "print" data, and/or to enhance the quality of the hardcopy by the process of "sharpening." For example, for purposes of illustration and without limitation, in one embodiment of the present invention, DSP 120 performs a two-dimensional interpolation on the digital image data by using two one-dimensional interpolation steps. Specifically, DSP 120 performs: (a) a one-dimensional interpolation step to provide digitized image data for an "interpolated" line on image 50 which is disposed between two actual lines acquired by Image Scan and Acquisition Module 100 and (b) a second one-dimensional interpolation step on each of the scan lines, actual or interpolated, to produce digitized image data for "interpolated" data points which are disposed between the input data points. In particular, such interpolation steps may comprise, but are not limited to the following interpolation steps which are well-known to those of ordinary skill in the art: nearest neighbor interpolation; bilinear interpolation; cubic convolution; and so forth. Further, as was mentioned above, the digitized image data, including any interpolated digitized image data, may be sharpened in a manner which is known to those of ordinary skill in the art. Still further, specific embodiments of the present invention can apply different methods of interpolation to different parts of image 50. Yet still further, as was indicated above, the software which is stored in DSP Program Memory 121 was transferred thereto from System Control 115. It should be noted that: (a) in some embodiments the software may be loaded prior to printing each page to provide for the use of different imaging algorithms for different images; (b) in other embodiments the software may be loaded prior to printing different portions of an image; or (c) in still other embodiments the software is loaded once, at the time the system is powered up.

The output of the image processing provided by DSP 120, for this embodiment, comprises eight bit numbers which correspond to gray levels of the processed pixels. However, it should be understood that the present invention is not limited to the use of eight bit intensity levels. The image processing output is stored in Out Buffer 140. The embodiment described herein which entails transferring image data to Pixel Generator 700, storing it in INX Memory 125, and performing image processing upon the image data in real time is advantageous because it reduces memory costs for the inventive printer.

In the preferred embodiment, while the drum rotates through one revolution, image data necessary to create two output lines on medium 205 is input to Pixel Generator 700, where an output line is defined to extend in the direction of rotation. During the next revolution of the drum, two more lines are transferred while the two lines that were transferred during the previous revolution are image processed and output to Out Buffer 140. On the third revolution, two more lines are input, the lines on the previous revolution are processed and stored, and the lines that were processed during the second revolution are output to be printed on the rotating drum. This continues until the entire "page" has been printed. However, some images do not require two lines on every rotation for every output line. In the case of interpolations transferring of input lines to the Pixel Generator 700 may be less frequent.

As described above, image processing, DSP 120 transfers eight bit digitized output image data to Out Buffer 140 for storage. Out Buffer 140 is apparatus which is well-known to those of ordinary skill in the art for storing digitized image data. For example, in the preferred embodiment of the present invention, Out Buffer 140 is a dual ported buffer, for example, dual ported RAM, with read/write capability through one port by DSP 120 at a first rate and with read capability by LUT Processor 170 through the second port. This enables the data to be accessed by the remainder of the output path of Pixel Generator 700 at a rate which is commensurate with the rate at which the image is to be written and the speed of rotation of the drum. Further, in the preferred embodiment, Out Buffer 140 is configurable so that one or two lines of pixels may be output from different sections thereof, and DSP 120 stores up to 4K pixels per line therein. However, Out Buffer 140 is not required to be a dual ported RAM and may be, for example, a FIFO.

In accordance with the present invention, LUT processor 170 receives pixel data from Out Buffer 140 in the form of pixel values and pel address information, referred to below as row addresses, from Pixel Size 163. LUT Processor 170 uses the input to retrieve pel configuration pattern information from among a multiplicity of predetermined pel configuration patterns. The pixel data from Out Buffer 140—the buffer is selected by DSP 120—is transferred to LUT Processor 170 in response to address information received from Pixel Size 163.

The manner in which LUT processor 170 converts a pixel datum, i.e., the digitized output image data for an area modulation pixel, into pel information which is derived from a multiplicity of predetermined pel configuration patterns will be explained in further detail below. However, at this point the structure of LUT Processor 170 is described in further detail. Specifically, LUT Processor 170 is comprised of look-up table memories LUT0 and LUT1. In the preferred embodiment of the present invention, each memory contains the same look-up table data for use in mapping from intensity level, i.e., pixel datum, to pel configuration pattern. LUT0 and LUT1 are comprised, in a manner which is well-known to those of ordinary skill in the art, from memory storage devices which are well-known to those of ordinary skill in the art. A pel configuration pattern which corresponds to each possible intensity level datum is predetermined from, for example, the results of psycho-physical testing. However, the present invention is not limited to the use of one particular mapping. Specifically, it is within the spirit of the present invention that, in some embodiments thereof, the tone scale mapping between a particular intensity level and a pel configuration pattern may be varied by varying the initial configuration of printer 10 or by storing several sets of mappings and by receiving manual input from a user, as illustrated in FIG. 3, as to which of the predetermined tone scale mappings is to be used for making a particular copy. For example, the manual input may be received by means of a user setting an indicator or depressing a button or by means of a user providing input to a user interactive system. The tone scale may be varied for use in a particular application for the purpose of, for example, brightness and/or contrast adjustment.

The output from LUT processor 170 is data which is used to control the behavior of Lasers 195 of Laser Module 750. Specifically, in a preferred embodiment of the present invention, LUT Processor 170 provides 16 bit numbers which are comprised of four, hex-coded bits for each of four lasers which comprise Lasers 195. For purposes of this description, and that set forth below, we designate lasers 1, 2, and 3 of Lasers 195 as being capable of providing a substantially 30 $\mu m \times 3 \mu m$ pel and laser 4 of Lasers 195 as being capable of providing a substantially 5 $\mu m \times 3 \mu m$ pel. The four, hex-coded bits are encoded so as to effectuate the slice method which has been described above, which slice method divides up the time during which a laser is activated so as to be able to illuminate medium 205 in areas which comprise fractions of a pel size.

Multiplexer and Delay 180 may be fabricated in a manner which should be readily understood by those of ordinary skill in the art from commercially available shift registers or from programmable gate arrays. In particular, Multiplexer and Delay 180 receives the above-described 16 bit numbers output from LUT Processor 170 as well as information from DSP 120 which indicates whether a 60 $\mu m \times 60 \mu m$ or a 90 $\mu m \times 90 \mu m$ pixel is being printed. This information is used, in a manner which is described in detail below, to select 4 bits per laser. The 4 bits per laser are used to develop signals which are used, in turn, to develop further signals that drive lasers 1-4. The signals corresponding to the four bits for specific ones of lasers 1-4 are also delayed relative to each other by Multiplexer and Delay 180.

The relative delay of the various laser drive signals is understood as follows. As has been described above, the preferred embodiment of inventive printer 10 utilizes four lasers in Lasers 195 to provide a "paintbrush" for printing lines of hardcopy on medium 205. In accordance with that, to prevent interference between the edges of the beams by, for example, diffraction and beam irregularities, from causing inadvertent print errors, which irregularities occur most often at beam edges, the laser beams which make up the "paint brush" are not physically disposed side-by-side in a line. The beam irregularities result from the fact that the intensity of a focused Gaussian laser beam gradually decreases from a maximum in the center of the beam. Thus, since focused laser beams cannot produce a uniformly intense spot, some areas of the medium may be well under or well over its exposure threshold. To avoid problems at the edges, the lasers are spatially offset in the direction of scanning. Thus, the firing of the lasers must be delayed relative to each other such that the pels generated by lasers 1, 2, 3, and 4 are aligned with each other when they expose the medium. As such, Multiplexer and Delay 180 adds or subtracts, as the case may be, predetermined delays in the firing times for the lasers which generate the "paintbrush" to compensate for their spatial offset. For example, in the preferred embodiment, lasers 2 and 3 are delayed 64$\mu$ relative to laser 1 and laser 4 is delayed 128$\mu$ relative to laser 1.

Multiplexer and Delay 180 transmits the 4 bit numbers for each of the four lasers to Slice 190. In the preferred embodiment, each four bit number is a four bit hex number from 7 to 15 which determines how many slices of a pel the laser is to be energized over, a pel having a maximum length of 3 $\mu m$ in the direction of rotation of the drum.

Slice 190 may be fabricated in a manner which should be readily understood by those of ordinary skill in the art from commercially available programmable array logic or from programmable gate arrays. In particular, Slice 190 converts the input from Multiplexer and Delay 180 into four digital signals, one per laser, that are applied as input to laser drivers in Laser Module 750, which digital signals are high or low when a laser is on or off, respectively.

Phase-Locked Loop 185 (PLL 185) receives input from Drum Encoder 187 which detects rotation of the drum and generates a signal which is input to Slice 190 so that the output from Slice 190 is synchronized to the rotating drum. In the preferred embodiment, one tick of the slice clock corresponds to 0.375 $\mu m$ at 2150 rpm or any other suitable speed.

In response to the digital signals output from Slice 190, laser drivers in Laser Module 750 produce high current drive signals which are applied to drive Lasers 195. In response to the drive signals, Lasers 195 output timed beams of radiation which impinge upon medium 205 and produce therein a copy of image 50. It will, of course, be clear to those of ordinary skill in the art that further lines are printed upon medium 205 as the radiation output from Lasers 195 is moved across medium 205 in a direction transverse to the direction of a line when the optical head (not shown) in Laser Module 750, which holds Lasers 195, is moved in the transverse direction. An example of a suitable optical head is shown for example in U.S. Pat. No. 5,161,064 entitled "Printer Optical Head" filed on the same date herewith and commonly assigned. Further, the lasers are only driven when their beams would impinge on medium 205 and they are not driven when their beams would impinge, for example, on drum clamps. In addition, it should be clear to those of ordinary skill in the art that inventive printer 10 further comprises apparatus which are well-known in the art but which have been omitted for ease of understanding the present invention. For example, inventive printer 10 includes, without limitation, the following types of modules: drum drivers, synchronizing means for drum positioning, laser autofocus apparatus, medium transport, and the like.

We will now described the manner in which data stored in Out Buffer 140 is applied as input to LUT processor 170 to generate laser drive signals. The eight bit processed data in Out Buffer 140 are output as the upper address of LUT0 and LUT1. The address of the eight bit data in Out Buffer 140 is determined by a signal transferred thereto from Pixel Size 163 and is the address of the printer side of the dual ported RAM of Out Buffer 140. This address signal is updated at a pixel rate. For example, for a 60 $\mu m \times 60 \mu m$ pixel, the address is updated every 60 $\mu m$, whereas, for a 60 $\mu m \times 90 \mu m$ pixel, the address is updated every 80 $\mu m$. The lower part of the address of LUT0 and LUT1, i.e., the row address, is generated in response to an output signal from Pixel Size 163 which is applied as input to LUT Processor 170. The row address counter counts from 0 to 29 at a pel rate and rolls over at a rate corresponding to 3 $\mu m$ pels.

In a particular embodiment, the pixel and pel rates can be determined from the following information: the length of the page, for example, 10 inches; the size of the pixel, for example, 60 $\mu m \times 60 \mu m$, 90 $\mu m \times 90 \mu m$, and so forth; the size of the pel; and the rotation speed of the drum. For example, the pel rate is equal to (slice clock)/8 and, in an embodiment where the drum rotation speed is 2400 rpm and a pel is 3 μm, the pel rate is 30 MHz/8. Further, the pixel rate is the (pel rate)/(number of pels in a pixel). Lastly, for a 60 μm×60 μm pixel, there are 20 pels/pixel and, for a 90 μm×90 μm pixel, there are 30 pels/pixel.

Figure 5:
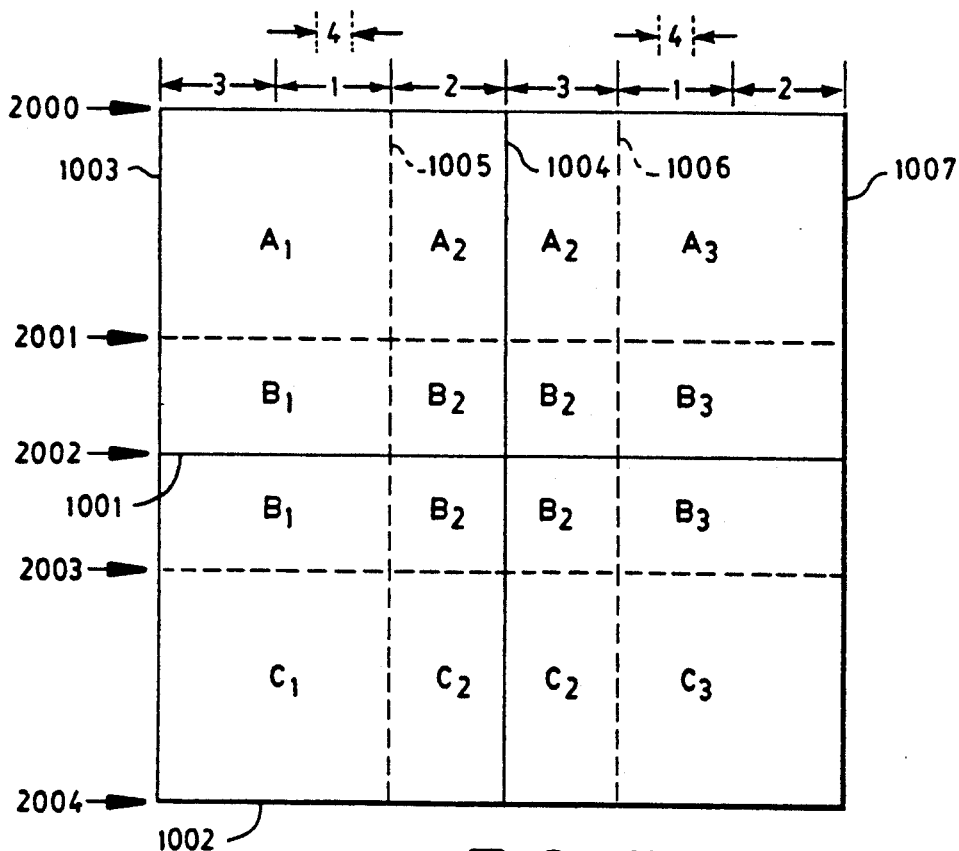
FIG. 5 shows, in pictorial form, a comparison between an arrangement of 60 $\mu m \times 60$ $\mu m$ pixels and 90 $\mu m \times 90$ $\mu m$ pixels.
Figure 6:
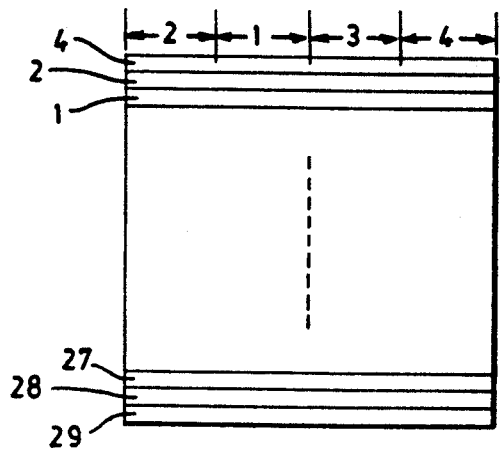
FIG. 6 shows how laser drive data is arranged for a 90 $\mu m \times 90$ $\mu m$ pixel.

We now turn to describe, in detail, the manner in which data is retried from LUT Processor 170 with reference to FIGS. 5 and 6. FIG. 5 helps to show how data stored in LUT0 and LUT1 is retrieved to supply pel information which is used to drive Lasers 195 in Laser Module 750. Specifically, FIG. 5 helps to show how data is retrieved to supply pel information for a 60 μm×60 μm pixel and for a 90 μm×90 μm pixel in accordance with our discovery that the mapping for a 90 μm×90 μm pixel may also be used to provide a 60 μm×60 μm pixel and other pixel sizes as well.

In particular, first consider the case of a 90 μm×90 μm pixel. As was described above with respect to the preferred embodiment of the present invention, a paintbrush for Lasers 195, as shown above arrow 2000 in FIG. 5, is comprised of laser 3, lasers 1 and 4, and laser 2. The footprint of each of lasers 1, 2, and 3 is 30 μm and the footprint of laser 4 is 5 um along the direction indicated by arrow 2000. Thus, as lasers 1-4 are excited and impinge upon medium 205 along the path between lines 1003 and 1004, they "paint" with a brushstroke which is 90 μm across. Further, as shown in FIG. 5, the distance between arrows 2000 and 2002 are 90 μm. Thus, there are 30 pels in the 90 μm×90 μm pixel whose borders are lines 1003 and 1004, and the lines indicated by arrows 2000 and 2002.

The data which are stored in LUT0 and LUT1 are identical and these data correspond to the 90 μm×90 μm pixel just described. As a result, for a 90 μm×90 μm pixel, one only needs to retrieve data which is stored in LUT0. FIG. 6 shows a matrix of data corresponding to a 90 μm×90 μm pixel. The rows 0-29 correspond to pels for lasers 1-4 and each row, i.e., rows 0-29, contains a 16 bit number which has four bit, hex coded values for each of lasers 1-4.

In order to retrieve this data, one needs to present LUT Processor 170 with two pieces of information, i.e., the intensity level of the pixel—in the preferred embodiment this is an eight bit number between 0 and 255—and a pel number—in this embodiment a pel number is a row address between 0 and 29 which corresponds to the pels which are painted as the laser beams impinge upon medium 205 between arrows 2000 and 2002. In response to this information, LUT Processor 170 retrieves a 16 bit number from LUT0 where bits 0-3 are used for laser 2; bits 4-7 are used for laser 1; bits 8-11 are used for laser 3; and bits 12-15 are used for laser 4. Of course, those of ordinary skill in the art understand that this choice of bits is arbitrary and may be changed in other embodiments. For example, this choice of bits may be changed in software or in cabling.

The inputs to LUT Processor 170 which correspond to the intensity levels of the pixels and the row addresses of the pels are obtained from Out Buffer 140 and Pixel Size 163, respectively. Pixel Size 163 has three registers which contain the following information, respectively: the number of pels/pixel; the number of pixels/line; and the number of lines/page. As such, Pixel Size 163 transmits a number to Out Buffer 140 which corresponds to the location of the pixels in a line to be printed. Out Buffer 140 uses this number to address the pixels which are stored therein and which correspond to a line. Out Buffer 140 retrieves the value in its memory which corresponds to the intensity level of the pixel and applies it as input to LUT Processor 170. At the same time, Pixel Size 163 applies the value of a row counter which cycles between 0 and 29 as input to LUT Processor 170.

As one can readily appreciate, as Out Buffer 140 cycles through the pixels stored in its memory and, for each such pixel, as Pixel Size 163 cycles through 0-29, a line of data is retrieved for use in firing Lasers 195 in Laser Module 750.

We now turn to the case of a 60 μm×60 μm pixel. This case is complicated by two facts. First, in order to take advantage of all four lasers, a 60 μm×60 μm pixel requires the simultaneous printing of one and one-half such pixels. Second, due to the real time constraints on the system, there is not enough time available to retrieve the necessary data from a single look-up table memory.

With reference to FIG. 5, LUT Processor 170 retrieves the necessary laser drive data as follows. First, consider the region denoted by $A_1$ between lines 1003 and 1005 and arrows 2000 and 2001 to be pixel 1; the region denoted by $A_2$ between lines 1005 and 1006 and arrows 2000 and 2001 to be pixel 2; and the region denoted by $A_3$ between lines 1006 and 1007 and arrows 2000 and 2001 to be pixel 3. The pixels in the line of pixel 1 are painted with laser 3 and lasers 1 and 4 using data obtained from LUT0; the pixels in the line of pixel 2 are painted with laser 2 and laser 3 using data obtained from LUT1; and the pixels in the line of pixel 3 are painted with lasers 1 and 4 and laser 2 using data obtained from LUT0. As one can readily appreciate, the lines of pixels across a page, i.e., the direction transverse to the direction in which lines are painted, obtained data to drive the lasers alternatively from LUT0 and LUT1 in a variety of sequences.

In addition to the above, since a "paintbrush" utilizes laser 3, lasers 1 and/or 4, and laser 2, the paintbrush covers one and one-half of a 60 μm×60 μm pixel simultaneously. The data to accomplish this task is retrieved as follows. (1) The data for laser 3 and lasers 1 and 4 for the pixel between lines 1003 and 1005 and arrows 2000 and 2001 are obtained from LUT0 by providing intensity level $A_1$ and row addresses 0-19 to LUT Processor 170. For each 16 bit number retrieved therefrom: bits 8-11 are for laser 3; bits 4-7 are for laser 1; and bits 12-15 are for laser 4. (2) The data for laser 2 for one-half of the pixel between lines 1005 and 1004 and arrows 2000 and 2001 are obtained from LUT1 by providing intensity level $A_2$ and row addresses 0-19 to LUT Processor 170. For each 16 bit number retrieved therefrom: bits 0-3 are used for laser 2. (3) The data for laser 3 and lasers 1 and 4 for the pixel between lines 1003 and 1005 and arrows 2001 and 2003 are obtained from LUT0 by providing intensity level $B_1$ and row addresses 20-29 to LUT Processor 170 for the portion between arrows 2001 and 2002 and by providing intensity level $B_1$ and row addresses 0-9 to LUT Processor 170 for the portion between arrows 2002 and 2003. For each 16 bit number retrieved therefrom: bits 8-11 are for laser 3; bits 4-7 are for laser 1; and bits 12-15 are for laser 4. (4) The data for laser 2 for one-half of the pixel between lines 1005 and 1004 and arrows 2001 and 2003 are obtained from LUT1 by providing intensity level $B_2$ and row addresses 20-29 to LUT Processor 170 for the portion between arrows 2001 and 2002 and by providing intensity level $B_2$ and row addresses 0–9 to LUT Processor 170 for the portion between arrows 2002 and 2003. For each 16 bit number retrieved therefrom: bits 0–3 are used for laser 2. (5) The data for laser 3 and lasers 1 and 4 for the pixel between lines 1003 and 1005 and arrows 2003 and 2004 are obtained from LUT0 by providing intensity level $C_1$ and row addresses 10–29 to LUT Processor 170. For each 16 bit number retrieved therefrom: bits 8–11 are for laser 3; bits 4–7 are for laser 1; and bits 12–15 are for laser 4. (6) The data for laser 2 for one-half of the pixel between lines 1005 and 1004 and arrows 2003 and 2004 are obtained from LUT1 by providing intensity level $C_2$ and row addresses 10–29 to LUT Processor 170. For each 16 bit number retrieved therefrom: bits 0–3 are used for laser 2.

We will now describe the manner in which the laser drive data for the second half of the line of pixel 2 and the line of pixel 3 are obtained. (1) The data for laser 3 for one-half of the pixel between lines 1004 and 1006 and arrows 2000 and 2001 are obtained from LUT1 by providing intensity level $A_2$ and row addresses 0–19 to LUT Processor 170. For each 16 bit number retrieved therefrom: bits 8–11 are used for laser 3. (2) The data for lasers 1 and 4 and laser 2 for the pixel between lines 1006 and 1007 and arrows 2000 and 2001 are obtained from LUT0 by providing intensity level $A_3$ and row addresses 0–19 to LUT Processor 170. For each 16 bit number retrieved therefrom: bits 4–7 are for laser 1; bits 12–15 are for laser 4; and bits 0–3 are for laser 2. (3) The data for laser 3 for one-half of the pixel between lines 1004 and 1006 and arrows 2001 and 2003 are obtained from LUT1 by providing intensity level $B_2$ and row addresses 20–29 to LUT Processor 170 for the portion between arrows 2001 and 2002 and by providing intensity level $B_2$ and row addresses 0–9 to LUT Processor 170 for the portion between arrows 2002 and 2003. For each 16 bit number retrieved therefrom: bits 8–11 are used for laser 3. (4) The data for lasers 1 and 4 and laser 2 for the pixel between lines 1006 and 1007 and arrows 2001 and 2003 are obtained from LUT0 by providing intensity level $B_3$ and row addresses 20–29 to LUT Processor 170 for the portion between arrows 2001 and 2002 and by providing intensity level $B_3$ and row addresses 0–9 to LUT Processor 170 for the portion between arrows 2002 and 2003. For each 16 bit number retrieved therefrom: bits 4–7 are for laser 1; bits 12–15 are for laser 4; and bits 0–3 are for laser 2. (5) The data for laser 3 for one-half of the pixel between lines 1004 and 1006 and arrows 2003 and 2004 are obtained from LUT1 by providing intensity level $C_2$ and row addresses 10–29 to LUT Processor 170. For each 16 bit number retrieved therefrom: bits 8–11 are used for laser 3. (6) The data for lasers 1 and 4 and laser 2 for the pixel between lines 1006 and 1007 and arrows 2003 and 2004 are obtained from LUT0 by providing intensity level $C_3$ and row addresses 10–29 to LUT Processor 170. For each 16 bit number retrieved therefrom: bits 4–7 are for laser 1; bits 12–15 are for laser 4; and bits 0–3 are for laser 2.

As above, the inputs to LUT Processor 170 which correspond to intensity levels and row addresses are obtained from Out Buffer 140 and Pixel Size 163, respectively. However, in this case, instead of sequencing through a single line of pixel intensity level data, Out Buffer 140 sequences through two lines as the same time. As was indicated above, this enables LUT Processor 170 to apply the intensity level from one line to LUT0 while the intensity level from the other line is being applied to LUT1. Specifically, as was shown above, The intensity level from pixels in the line of pixel 1 are applied to LUT0 and the intensity level from pixels in the line of pixel 2 are applied to LUT1. Then, after the line of pixel 1 and the first one-half of the line of pixel 2 have been printed, the intensity level from pixels in the line of pixel 2 are applied to LUT1, and the intensity level from pixels in the line of pixel 3 are applied to LUT0 to print the second half of the line of pixel 2 and the line of pixel 3. This alternating technique continues until all of the lines on the page are printed.

In addition to the above, it should be understood that embodiments of the present invention also apply to situations which utilize pixel replication and magnification. For example, using repeat factors for lines and/or for pixels, an image may be magnified in either direction in integer increments with the smallest size being such that one pixel is mapped into a single output pixel as has been described in regard to the preferred embodiment set forth above. In addition, as a special case, shading characters are realized when the replication factors are such that each input pixel produces an integral number of output pixels. In this case, the intensity level is represented by a whole matrix and never by a fraction of a matrix. Further in addition, the aspect ratio of the pixels may be adjusted by using non-equal pixel and line replications to correct for non-square input pixels, output pixels, and/or both. Such various embodiments may be provided by appropriately programming DSP 120 in a manner which should be clear to those of ordinary skill in the art.

It should be noted that, in the preferred embodiment, the pixel to pel configuration pattern mapping was a particular type of mapping. However, it should be noted, that the present invention is not limited to the use of the mapping of the preferred embodiment. In general, the present invention applies to embodiments wherein the pixel to pel configuration pattern mapping is a whole host of different mapping functions such as, for example and without limitation, area modulation imaging produced by clustered threshold arrays, dispersed dot ordered dither mapping, rectangular or hexagonal array structures, non-monotonic pel configuration patterns wherein pels that are used in a lower gray scale level do not have to be used in higher gray scale levels, and so forth.

Embodiments of the present invention which utilize such variations in pixel to pel configuration pattern mappings may be fabricated by fabricating LUT Processor 170, in a manner which should be clear to those of ordinary skill in the art, to retrieve the appropriate data from matrices which comprise such mapping data. For example, in an embodiment of the printer wherein DSP 120 provides pixel intensity levels that are buffered in Out Buffer 140 so as to print multiple lines in a single pass of a multiple writing element print head comprised of Lasers 195, the lines in Out Buffer 140 may be double buffered so that, while one group of lines is being printed, the next group of lines can be read therein.

For example, in such an embodiment, Pixel Generator 700 is initialized with: the number of lines; pixel intensity levels to be printed per line; and the number of pels in a pixel. Further, space is allocated for buffers in Out Buffer 140; pointers to the current printing and loading buffers in Out Buffer 140 are initialized; and corresponding flags for these two conditions are set.

The first step in printing is to load a line into the buffer. There is a signal, PGactive, that indicates the position of the rotating drum. PGactive indicates when the lasers are active, i.e., printing a line, and when the lasers are over a clamp, i.e., the lasers are off. As the drum rotates through one revolution, DSP 120 fills a buffer in Out Buffer 140, beginning when the lasers are over the clamp, with 1 or 2 lines of eight bit pixels, depending on whether a 60 μm or a 90 μm pixel is being printed. During the same revolution, 1 or 2 lines of eight bit pixels that where written to Out Buffer 140 from DSP 120 during the previous revolution are output from Out Buffer 140 to LUT 170 to be printed on a page. During the next revolution, DSP 120 fills the buffers that were previously used for printing and Out Buffer 140 outputs from the buffers that were filled by DSP 120 during the previous revolution.

In such embodiments, printing a pixel requires the retrieval from a memory such as LUT Processor 170 of the pixel to pel mapping. For example, the inputs for the mapping are intensity level, column pointer, and row pointer for the pel at a particular column and row of the matrix corresponding to the intensity level. The manner in which such mapping matrices may be stored and retrieved from storage is well known to those of ordinary skill in the art.

Other embodiments of the invention, including additions, subtractions, deletions and other modifications of the preferred disclosed embodiments of the invention will be obvious to those skilled in the art and are within the scope of the following claims.

TABLE I

| GROUP | BEGINNING OF CLUSTER LOCATION | | CLUSTER SIZE RANGE IN SLICES | |
|---|---|---|---|---|
| | Row | Laser | Min. | Max. |
| A | 5 | 4 | 6 | 200 |
| B | 5 | 4 | 110 | 200 |
| | 0 | 3 | 12 | 12 |
| C | 5 | 4 | 110 | 200 |
| | 15 | 2 | 12 | 12 |
| | 0 | 3 | 12 | 12 |
| D | 0 | 3 | 12 | 88 |
| | 5 | 4 | 200 | 200 |
| | 15 | 2 | 12 | 88 |
| E | 0 | 3 | 40 | 88 |
| | 15 | 3 | 0 | 88 |
| | 5 | 4 | 200 | 200 |
| | 15 | 2 | 40 | 88 |
| | 0 | 2 | 0 | 88 |
| F | 0 | 3 | 64 | 96 |
| | 0 | 1 | 24 | 96 |
| | 0 | 2 | 64 | 96 |
| | 15 | 3 | 64 | 96 |
| | 15 | 1 | 24 | 96 |
| | 15 | 2 | 64 | 96 |
| G | 0 | 3 | 192 | 216 |
| | 0 | 1 | 192 | 216 |
| | 0 | 2 | 192 | 216 |
| H | 0 | 3 | 240 | 240 |
| | 0 | 1 | 192 | 216 |
| | 0 | 2 | 192 | 216 |
| I | 0 | 3 | 240 | 240 |
| | 0 | 1 | 192 | 216 |
| | 0 | 2 | 240 | 240 |
| J | 0 | 3 | 240 | 240 |
| | 0 | 1 | 240 | 240 |
| | 0 | 2 | 240 | 240 |

What is claimed is:

1. Printing apparatus for providing drive signals to an energy source whose output is utilized in forming an image in hardcopy form in a medium as a plurality of pixels, said printing apparatus comprising:

means for receiving an input image signal representing at least a portion of an image to be formed;
   means responsive to the receipt of the input image signal for producing at least one pixel signal that represents at least one area modulation pattern for at least one of said pixels, said area modulation pattern being comprised of subpixels called pels and said at least one area modulation pattern corresponding to the density of at least a part of said at least a portion of an image to be formed;
   drive means responsive to said at least one pixel signal for generating at least one set of predetermined pel configuration pattern signals corresponding to said at least one area modulation pattern of pels; and
   an energy source, being responsive to said at least one set of predetermined pel configuration pattern signals, for producing said output and for applying said output to the medium for forming said image in hardcopy form as a plurality of pixels,
   wherein said drive means comprises means for generating signals for driving the energy source to generate output which provides pixels having at least two different area sizes in the hardcopy form.

2. The apparatus of claim 1 wherein the drive means comprises memory for storing area modulation pattern of pel data and for providing said area modulation pattern of pel data in response to information derived from said at least one pixel signal and
   said drive means further comprising means, in response to said area modulation pattern of pel data, for generating said predetermined pel configuration pattern signals.

3. The apparatus of claim 2 wherein the data stored in the memory means comprises data for causing the drive means to produce predetermined pel configuration pattern signals for pixels of different area sizes.

4. The apparatus of claim 3 wherein the same data is used to provide predetermined pel configuration signals for the pixels of different area sizes.

5. The apparatus of claim 1 wherein said energy source comprises a plurality of lasers arranged to create pels in columns substantially adjacent one another in the direction of print scanning.

6. A method for providing drive signals to an energy source whose output is utilized in forming an image in hardcopy form in a medium as a plurality of pixels, said method comprising the steps of:

receiving an input image signal representing at least a portion of an image to be formed;
   responsive to receiving the input image signal, producing at least one pixel signal that represents at least one area modulation pattern for at least one of said pixels, said area modulation pattern being comprised of subpixels called pels and said at least one area modulation pattern corresponding to the density of at least a part of said at least a portion of an image to be formed; and
   in response to receiving said at least one pixel signal, generating at least one set of predetermined pel configuration pattern signals corresponding to said at least one area modulation pattern of pels and activating an energy source with them to produce said output and applying said output to the medium for forming said image in hardcopy form as a plurality of pixels, wherein the predetermined pel configuration pattern signals are adapted to drive the energy source to generate output which provides pixels having at least two different area sizes in the hardcopy form.

7. The method of claim 6 further including the steps of storing in a memory area modulation pattern of pel data wherein said memory provides said area modulation pattern of pel data in response to information derived from said at least one pixel signal and generating predetermined pel configuration pattern signals in response to the area modulation pattern of pel data.

8. The method of claim 7 wherein the data stored in the memory provides data for producing predetermined pel configuration signals for activating said energy source to produce said pixels of different area sizes.

9. The method of claim 8 wherein the same data is used to provide predetermined pel configuration signals for the pixels of different area sizes.

* * * * *